US012137175B1

(12) United States Patent
Sharma et al.

(10) Patent No.: US 12,137,175 B1
(45) Date of Patent: Nov. 5, 2024

(54) CERTIFICATE AUTHORITY META-RESOURCE FOR AUTOMATED ROTATION AND RENEWAL

(71) Applicant: Amazon Technologies, Inc., Seattle, WA (US)

(72) Inventors: Param Sharma, Haymarket, VA (US); Todd Cignetti, Ashburn, VA (US); Josh Rosenthol, Centreville, VA (US); Jonathan Kozolchyk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 17/364,160

(22) Filed: Jun. 30, 2021

(51) Int. Cl.
*H04L 9/32* (2006.01)
*H04L 9/30* (2006.01)

(52) U.S. Cl.
CPC .......... *H04L 9/3265* (2013.01); *H04L 9/3073* (2013.01)

(58) Field of Classification Search
CPC ............................ H04L 9/3265; H04L 9/3073
See application file for complete search history.

(56) References Cited

U.S. PATENT DOCUMENTS 11,240,043 B1 * 2/2022 Leblang ................ H04L 67/025
11,323,274 B1 * 5/2022 Bowen .................. H04L 9/0897
11,533,185 B1 * 12/2022 Sharma ..................... H04L 9/14
2009/0132813 A1 * 5/2009 Schibuk ............. G06Q 20/4014 726/9
2019/0260599 A1 * 8/2019 Williams ............ H04L 63/0209
2020/0059372 A1 * 2/2020 Goeringer ............... H04L 9/007
2020/0154272 A1 * 5/2020 Uy ........................ H04W 12/04
2020/0358764 A1 * 11/2020 Hojilla Uy ............ H04L 9/0866

* cited by examiner

*Primary Examiner* — Saleh Najjar
*Assistant Examiner* — Devin E Almeida
(74) *Attorney, Agent, or Firm* — Athorus, PLLC

(57) ABSTRACT

Described are automated systems and methods for employing certificate authority meta-resources to facilitate automatic renewal and/or rotation of certificates and/or certificate authorities in a PKI hierarchy. For example, embodiments of the present disclosure can provide creating a certificate authority meta-resource, which can maintain and monitor certain information to facilitate automatic renewal and rotation of certificates and/or certificate authorities in a PKI hierarchy. The certificate authority meta-resource can also keep track of the active certificate authorities and certificates to ensure that trust is maintained without manual configuration of the PKI hierarchy.

16 Claims, 15 Drawing Sheets

CERTIFICATE AUTHORITY META-RESOURCE FOR AUTOMATED ROTATION AND RENEWAL

BACKGROUND

With the proliferation of network-based services, the secure transmission of electronic information can be critical. To ensure the secure transmission of electronic information, a public-key infrastructure (PKI) system may be employed. A PKI system typically relies on certificates (e.g., X.509 certificates) issued by one or more certificate authorities (CAs) to facilitate secure communication between devices communicating over a network using a security protocol such as transport layer security (TLS). However, managing PKI systems can be difficult, and the rotation of CAs and renewal of certificates can be of particular importance and difficulty. Manual monitoring of PKI systems, as well as manual rotation of CAs and renewal of certificates can be cumbersome. Further, improper monitoring of CA and certificate rotations and/or renewals can lead to network outages.

BRIEF DESCRIPTION OF DRAWINGS

The detailed description is described with reference to the accompanying figures.

DETAILED DESCRIPTION

Figure 1A:
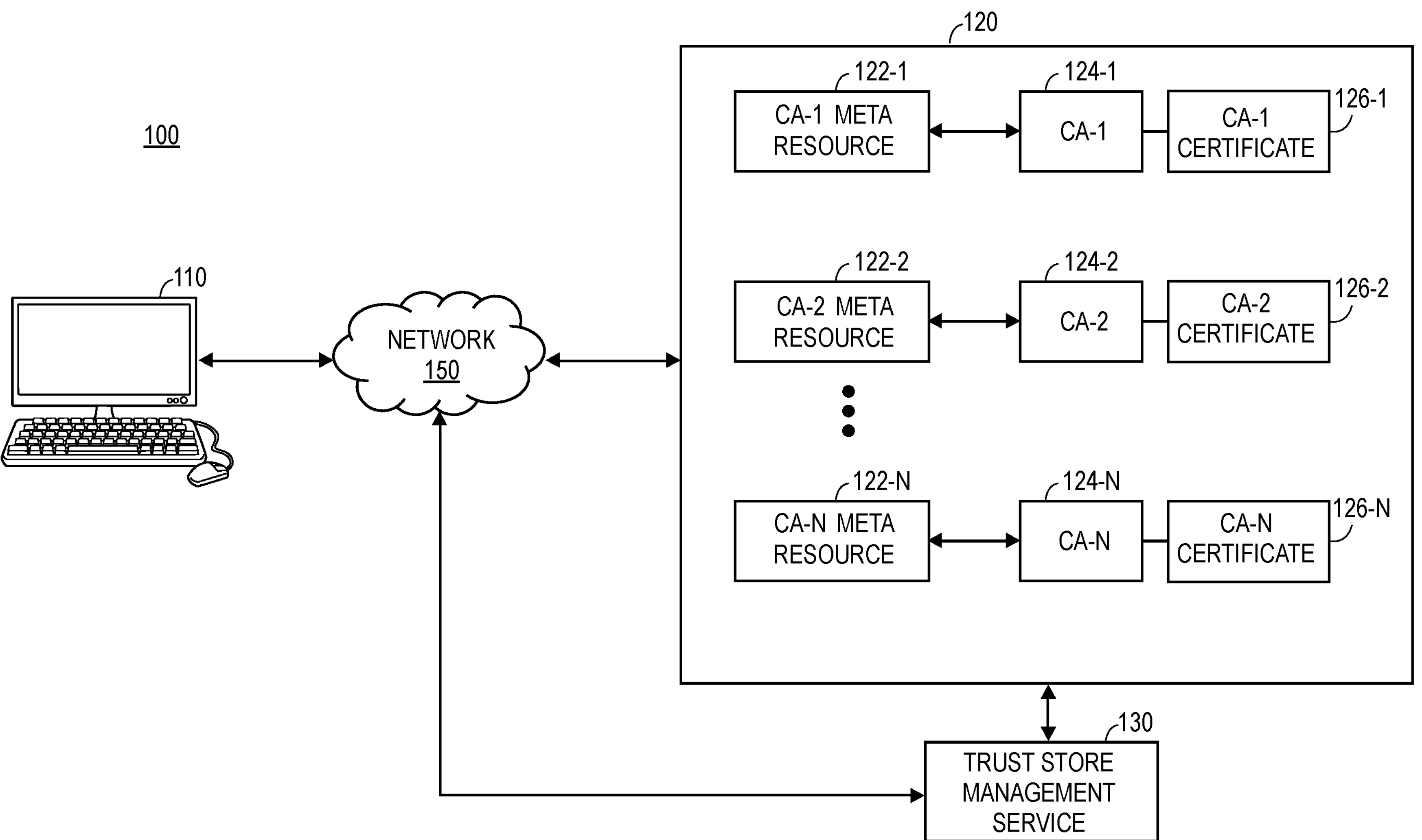
FIG. 1A is a block diagram illustration of an exemplary computing environment, according to exemplary embodiments of the present disclosure.

As set forth in greater detail below, embodiments of the present disclosure can provide systems and methods for creating one or more certificate authority (CA) meta-resources configured to maintain and monitor certain information associated with CAs of a public key infrastructure (PKI) hierarchy to facilitate management of the PKI hierarchy. The CA meta-resources can maintain the active CAs that are being used in the PKI hierarchy for issuance. Accordingly, the CA meta-resources can effectively be a front end to the PKI hierarchy to facilitate interaction with the CA meta-resources, which can maintain the current active and/or issuing CAs, rather than having to manually access, configure, manage, modify, access, etc. specific CAs of the PKI hierarchy. This can be of particular relevance in the rotation and/or renewal of CAs and/or certificates, as the CA meta-resource can maintain and keep track of the current active and/or issuing CAs during and after automated rotation and/or renewal of CAs and certificates. Accordingly, calls to the CA meta-resources can be made for issuances of certificates, as the CA meta-resources will maintain and track the current active issuing CAs. Further, as CA and/or certificate rotations and/or renewals may only be performed relatively infrequently (e.g., once a year, once every five years, ten years, etc.), the CA meta-resources can provide a consistent interface through which the PKI hierarchy can be accessed, modified, maintained, managed, and the like.

According to embodiments of the present disclosure, the CA meta-resources can, for example, be an object that can act as a bridge between a CA management service and a trust store management service to automatically maintain and monitor information associated with the CA, such as status of the CA, identification of a parent CA associated with the CA, the status of the CA certificate, rotation and/or renewal information associated with the CA certificate (e.g., renewal time period, grace period associated with renewal, rotation time period, grace period associated with rotation, etc.), rotation and/or renewal information associated with certificates issued by the CA (e.g., renewal time period, grace period associated with renewal, rotation time period, grace period associated with rotation, etc.), and the like. Accordingly, the CA meta-resource (e.g., via application programming interfaces (APIs), etc.) can facilitate management, reconfiguring, and/or updating the various aspects and/or configurations of a PKI hierarchy rather than performing these tasks manually.

According to embodiments of the present disclosure, during rotation and/or renewal of a CA and/or a certificate, the CA meta-resource may maintain and keep track of the CA and/or certificate being rotated out and/or renewed, as well as the new CA and/or certificate. Accordingly, a user can interact with the same CA meta-resource before, during, and after the CA and/or certificate is rotated out and/or renewed. The CA meta-resource can, for example, be automatically updated to seamlessly reflect the rotation and/or renewal of a CA and/or a certificate to ensure that trust is maintained and network outages are prevented. Accordingly, by tracking the CA and/or certificate during renewals and/or rotations, the CA meta-resource can prevent infrastructure outages by ensuring that trust is maintained during (and after) the renewal and/or rotation process. For example, certificate issuances during and after CA and/or certificate renewals/rotations can be handled by the CA meta-resources since the CA meta-resource will be tracking the current active issuing CAs, ensuring that trust is maintained and that outages are prevented. Further, the CA meta-resources can also communicate the rotation and/or renewal with a trust store management service, which can facilitate distribution of the new CAs and/or certificates to ensure trust of the rotated/renewed CAs and/or certificates to facilitate the transition to the new rotated/renewed CAs and/or certificates. This can include, for example, ensuring that trust of the rotated/renewed CAs and/or certificates is maintained throughout the PKI hierarchy.

According to additional aspects, the CA meta-resource can facilitate obtaining information regarding the configuration of the PKI hierarchy, as well as modifying and/or implementing changes to an existing PKI hierarchy without having to manually reconfigure the PKI hierarchy. For example, the CA meta-resource (e.g., via API calls, etc.) can be accessed to obtain information regarding the configuration of the PKI hierarchy (e.g., active CAs, issuing CAs, renewal and/or rotation information associated with CAs and/or certificates, identification of parent CAs, etc.) and/or update and/or make changes to the configuration of the PKI hierarchy (e.g., modify renewal and/or rotation information associated with CAs and/or certificates, reactivate a previously deactivated CA, etc.).

According to embodiments of the present disclosure, the CA meta-resource can be created and associated with each CA in a PKI hierarchy. The CA meta-resource may be created when the corresponding CA and/or PKI hierarchy is created and/or deployed. Alternatively, the CA meta-resource may be created at a later time.

Accordingly, the CA rotation and/or renewal information and certificate rotation and/or renewal information may be tracked so that it may be determined when the CA will need to be rotated/renewed and/or the certificates will need to be rotated/renewed. In implementations where it is determined that certificates issued by a CA are to be rotated, the certificate rotation/renewal may be initiated in view of the rotation/renewal and grace period information. For example, in situations where the certificate is being rotated, a new key pair may be generated and used to generate a certificate signing request (CSR). In implementations where certificates are being renewed and not rotated, the same key pair may be used (e.g., a new key pair is not generated) to generate a CSR. Once the CSR has been validated, a new certificate may be issued. Accordingly, the CA meta-resource may be updated to reflect the newly issued certificate. For example, after the new certificate has been created but not yet deployed, the CA meta-resource may indicate that the new certificate has a PREPARED status and the certificate being renewed still remains active. Next, a trust store management service may be notified of the new certificate. Accordingly, as the new certificate is distributed, the CA meta-resource can indicate that the newly issued certificate is ACTIVE. At this time, the CA meta-resource may DEACTIVATE the certificate being renewed. Alternatively, the CA meta-resource may maintain the certificate in an ACTIVE status. The trust store management service may distribute the new certificate to one or subscribers associated with the CA, so that a relying party can validate the certificates of the subscribers to successfully establish a secure connection (e.g., via TLS) to the subscriber. According to certain embodiments, in circumstances where the previous certificate has not yet expired and problems and/or issues are encountered with the newly issued certificate, the CA meta-resource can facilitate rolling back to the previous certificate while the issues with the newly issued certificate are resolved and/or a further new certificate is issued before deactivating the previous certificate. For example, the status of the new certificate can be set to DEACTIVATED and the previous certificate may be REACTIVATED or maintained in an ACTIVE status.

In another implementation where a CA is to be rotated/renewed, the CA meta-resource may first determine that the CA is to be rotated/renewed. Accordingly, the CA meta-resource may initiate rotation/renewal of the CA in view of the validity/renewal information and grace period information associated with the CA. A new CA may be created, and the CA meta-resource may indicate that the newly created CA has a status of PREPARED. During the grace period, the CA meta-resource may indicate that the newly created CA has a status of PREPARED, while maintaining the status of the CA to be rotated/renewed as ACTIVE. In implementations where the CA is being rotated, a new key pair for the newly created CA may be generated and used to generate a CSR. The newly generated key pair may include a key pair of any length (e.g., 256 bits, 512 bits, 1024 bits, 2048 bits, 4096 bits, etc.) and may be generated using any public key pair generation algorithm (e.g., RSA, DSA, EDSA, etc.). In situations where the CA is being renewed, no new key pair may be generated. The parent CA of the newly created CA may verify the CSR and issue and sign a CA certificate for the newly created CA. Accordingly, once the newly created CA may issue and sign end certificates for subscribers, the CA meta-resource may change the status of the newly created CA to ACTIVE. At this point, the CA meta-resource may maintain the status of the previous CA as ACTIVE, or change the status to DEACTIVATED. Similar to the renewal/rotation of certificates, a trust store management service may be notified of the new CA, and the trust store management service may distribute the newly issued CA certificate to the newly created CA, as well as any certificates issued by the newly created CA, to facilitate trust of the newly created CA and corresponding issued certificates. Upon completion of ensuring trust of the newly created CA and/or expiration of the grace period, the CA meta-resource can change the status of the previous CA to DEACTIVATED or REMOVED.

Accordingly, embodiments of the present disclosure can advantageously facilitate management and configuration of a PKI hierarchy via the CA meta-resources, which can automatically monitor and perform CA and certificate rotations/renewals to avoid unexpected network outages caused by unexpected CA and/or certificate expirations. Further, embodiments of the present disclosure may have particular applicability in PKI hierarchies that employ ephemeral certificates (e.g., certificates with relatively short validity periods—e.g., five days, ten days, etc.).

While the exemplary embodiments are described primarily with respect to PKI hierarchies, one of ordinary skill in the art will appreciate that the embodiments of the present disclosure may also be applied with encryption, authentication, and/or trust model systems such as, for example, a decentralized PKI, blockchain based systems, pretty good privacy systems, trust on first use systems, and the like. The descriptions utilizing PKI hierarchies are exemplary and are not limiting.

FIG. 1A is an illustration of an exemplary computing environment 100, according to exemplary embodiments of the present disclosure.

As shown in FIG. 1A, computing environment 100 may include client device 110, PKI hierarchy 120, and trust store management service 130. Client device 110 may be any computing device, such as a workstation, desktop or laptop computer, tablet, and the like. In the illustrated example, client device 110 can communicate with PKI hierarchy 120 and trust store management service 130 through a connection over network 150, such as the Internet, an intranet, wide area network, local area network, direction connection, etc. Further, network 150, and each of the other networks discussed herein, may utilize wired technologies (e.g., wires, USB, fiber optic cable, etc.), wireless technologies (e.g., radio frequency, infrared, near-field-communication (NFC), cellular, satellite, BLUETOOTH, etc.), or other connection technologies. Network 150 is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, BLUETOOTH, etc.), and/or other connection technologies.

As shown in FIG. 1A, PKI hierarchy 120 may include certificate authorities (CAs) 124-1, 124-2, through 124-N, each of which may include CA certificates 126-1, 126-2, through 126-N, respectively. PKI hierarchy 120 may include any number of CAs (each having an associated CA certificate) in any configuration, as well as any number of other components (e.g., registration authority, certificate revocation list (CRL)/online certificate status protocol (OCSP), etc.). Additionally, each CA 124-1, 124-2, through 124-N may include an associated CA meta-resource 122-1, 122-2, through 122-N, respectively. CA meta-resources 122-1, 122-2, through 122-N may include objects that may be created at the time PKI hierarchy 120 is created to maintain and monitor certain information (e.g., parent CA identifier, active CA identifier, issuing CA identifier, active issued certificate identifier, CA status, rotation information, renewal information, grace period information, and the like) associated with their corresponding CAs. For example, CA meta-resources 122-1, 122-2, through 122-N may be created as upon execution of a script or template (e.g., command line interface, application programming interface (API) template, cloud formation template, etc.) that can facilitate creation and deployment of a PKI hierarchy. Alternatively, CA meta-resources 122-1, 122-2, and 122-N may be created after creation of PKI hierarchy 120.

According to embodiments of the present disclosure, CA meta-resources 122-1, 122-2, through 122-N can, for example, automatically maintain and monitor certain information associated with corresponding CAs 124-1, 124-2, through 124-N, respectively. For example, the status of CAs 124-1, 124-2, through 124-N, identification of a parent CA associated with CAs 124-1, 124-2, through 124-N, the status of CA certificates 126-1, 126-2, through 126-N, renewal information associated with certificates issued by CAs 124-1, 124-2, through 124-N (e.g., renewal time period, grace period associated with renewal, etc.), rotation information associated with CAs 124-1, 124-2, through 124-N (e.g., rotation time period, grace period associated with rotation, etc.), and the like. The information regarding renewals and rotations for each CA may be provided by a user at time of creation of CA meta-resources 122-1, 122-2, through 122-N and/or may be updated after creation of CA meta-resources 122-1, 122-2, through 122-N. Alternatively and/or in addition, recommended renewal and rotation information (e.g., renewal and rotation frequencies, grace periods, etc.) for each CA may be suggested and proposed based on the configuration of the PKI hierarchy in which they are implemented, best practices, historical information, and the like at the time when CA meta-resources 122-1, 122-2, through 122-N are created and/or updated. For example, a knowledge-based system, an expert system, collaborative filtering algorithms, content filtering algorithms, a trained machine learning model, other inference-based systems, etc., or any combination thereof may be used to determine and present recommended renewal and rotation information.

According to embodiments of the present disclosure, CA meta-resources 122-1, 122-2, through 122-N (e.g., through APIs) can facilitate interaction, management, reconfiguration, etc. of PKI hierarchy 120. For example, API calls may be made to CA meta-resources 122-1, 122-2, through 122-N to obtain information regarding CAs 124-1, 124-2, through 124-N (e.g., active CAs, issuing CAs, renewal and/or rotation information associated with CAs and/or certificates, identification of parent CAs, etc.), update information associated with CAs 124-1, 124-2, through 124-N (e.g., modify renewal, rotation, and/or grace period information associated with CAs and/or certificates, etc.), perform certain actions in connection with CAs 124-1, 124-2, through 124-N (e.g., reactivate a previously deactivated CA, etc.), and the like. Further, in example implementations where one or more CAs 124-1, 124-2, through 124-N may be rotated and/or renewed with a new CA and/or CA certificate, CA meta-resources 122-1, 122-2, through 122-N may be associated with the newly rotated/renewed CA to facilitate continued interaction with CA meta-resources 122-1, 122-2, through 122-N even after the new CAs have been rotated in to interact with, manage, reconfigure, etc. the new CA.

According to embodiments of the present disclosure, CA meta-resources 122-1, 122-2, through 122-N can track and monitor information associated with each of CAs 124-1, 124-2, through 124-N, respectively, to facilitate automatic rotation/renewal of one or more of CAs 124-1, 124-2, through 124-N and/or automatic rotation/renewal of one or more certificates issued by CAs 124-1, 124-2, through 124-N to any applicable subscribers. Further, in facilitating automatic rotation/renewal of one or more of CAs 124-1, 124-2, through 124-N and/or automatic rotation/renewal of one or more certificates issued by CAs 124-1, 124-2, through 124-N, CA meta-resources 122-1, 122-2, through 122-N can keep track of the rotations and/or renewals to ensure that the active and/or issuing CA and/or certificate is identified so that trust is maintained during and after the rotation/renewal. This can facilitate issuance of trusted certificates during and after the renewal/rotation process, as CA meta-resources 122-1, 122-2, through 122-N will track the active issuing CAs, ensuring that calls made to CA meta-resources 122-1, 122-2, through 122-N for issuances of certificates will be assigned to the proper active issuing CA.

Further, CA meta-resource 122-1, 122-2, through 122-N can roll back to the previous CA and/or certificate during or after a rotation/renewal, if necessary. Also, CA meta-resource 122-1, 122-2, through 122-N can interface with trust store management service 130 to ensure that the automatic rotation/renewal of one or more of CAs 124-1, 124-2, through 124-N and/or the automatic rotation/renewal of one or more certificates issued by CAs 124-1, 124-2, through 124-N are distributed to the applicable clients to ensure trust of the new CAs and/or newly issued certificates.

Figure 1B:
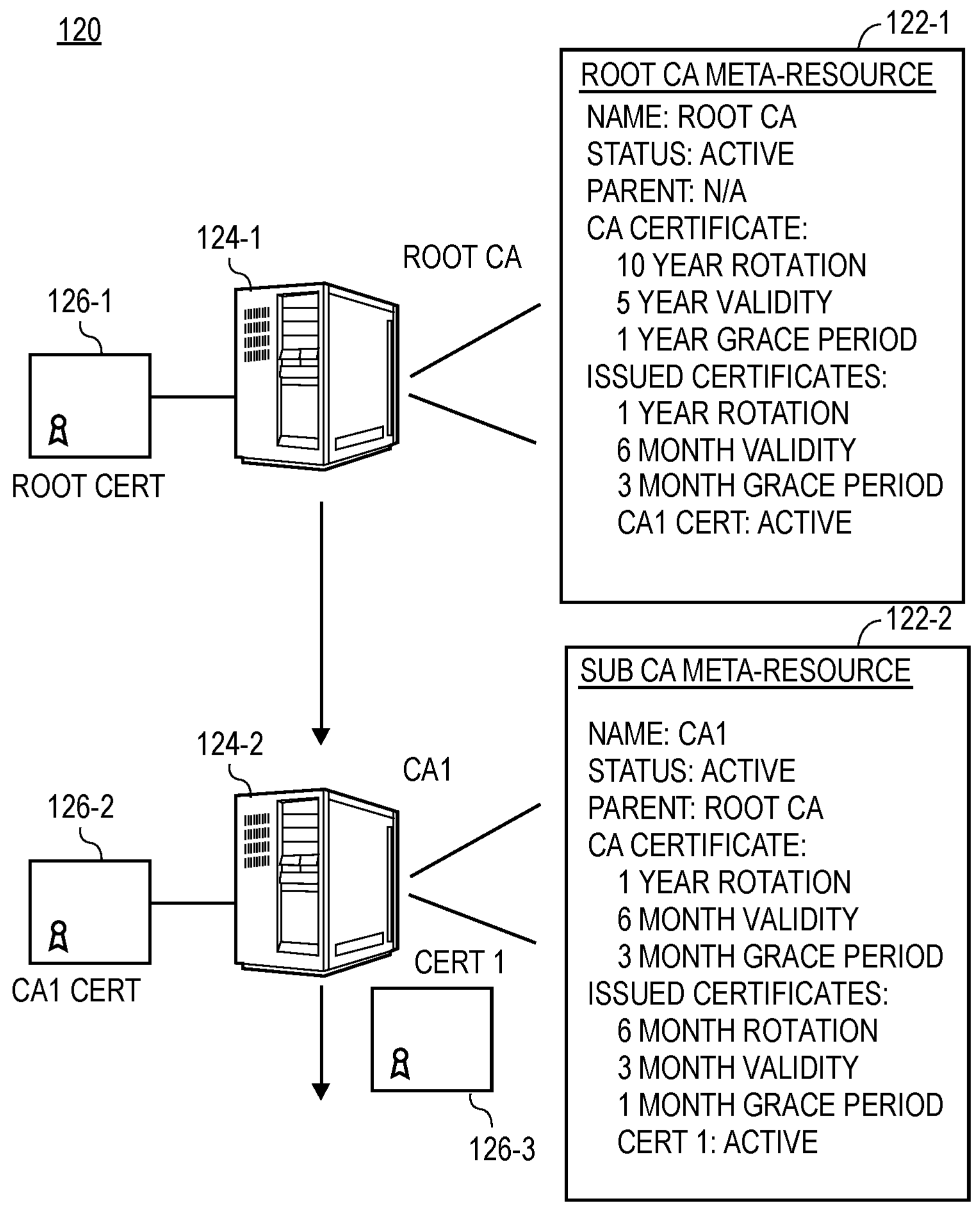
FIG. 1B is an illustration of an exemplary PKI hierarchy, according to exemplary embodiments of the present disclosure.

FIG. 1B illustrates an exemplary PKI hierarchy 120, according to embodiments of the present disclosure.

As shown in FIG. 1B, PKI hierarchy 120 may include root CA 124-1 with corresponding root certificate 126-1 (i.e., ROOT CA) and subordinate CA 124-2 (i.e., CA1) with corresponding CA certificate 126-2 (i.e., CA1 CERT). Further, subordinate CA 124-2 may issue certificates 126-3 (i.e., CERT1) to subscribers, end entities, etc. In the implementation shown in FIG. 1B, CA meta-resources 122-1 and 122-2 may be associated with root CA 124-1 and subordinate CA 124-2, respectively. In PKI hierarchy 120 shown in FIG. 1B, root CA 124-1 may be a parent to subordinate CA 124-2, and subordinate CA 124-2 may be an active issue CA which issues certificates 126-3. Accordingly, CA certificate 126-2 may have been issued and signed by root CA 124-1, and certificates 126-3 may have been issued and signed by subordinate CA 124-2. Further, according to certain aspects, CA 124-1 may be a root CA, and CA certificate 126-1 may be a root certificate issued and signed by CA 124-1.

As shown in FIG. 1B, CA meta-resource 122-1 may be associated with root CA 124-1 and may have an identifier ROOT CA META-RESOURCE, and CA meta-resource 122-2 may be associated with subordinate CA 124-2 and may have identifier SUB CA META-RESOURCE. Accordingly, CA meta-resource 122-1 may maintain and monitor certain information associated with root CA 124-1, and CA meta-resource 122-2 may maintain and monitor certain information associated with subordinate CA 124-2. For example, CA meta-resource 122-1 may include a name or identifier of root CA 124-1 (e.g., ROOT CA), a status of root CA-124-1 (e.g., ACTIVE), a name or identifier of a parent CA to root CA 124-1 (e.g., N/A), renewal/rotation information regarding root CA certificate 126-1 (e.g., ten year rotation, five year renewal, and one year grace period), and information regarding certificates issued by root CA 124-1, which may include CA certificate 126-2 (e.g., one year rotation, six month validity, three month grace period, and CA1 CERT: ACTIVE). Similarly, CA meta-resource 122-2 may include a name or identifier of subordinate CA 124-2 (e.g., CA1), a status of subordinate CA 124-2 (e.g., ACTIVE), a name or identifier of a parent CA to subordinate CA 124-2 (e.g., ROOT CA), renewal/rotation information regarding CA certificate 126-2 (e.g., one year rotation, six month renewal, and three month grace period), and information regarding whether the CA is actively issuing certificates (e.g., CERT 1: ACTIVE) and information associated with certificates (e.g., certificates 126-3) issued by CA 124-2 (e.g., six month rotation, three month renewal, one month grace period, and CERT1: ACTIVE).

According to embodiments of the present disclosure, CA meta-resources 122-1 and 122-2 can facilitate obtaining information regarding the root CA 124-1 and subordinate CA 124-2, as well as modifying and/or implementing changes to root CA 124-1 and subordinate CA 124-2 without having to manually reconfigure root CA 124-1 or subordinate CA 124-2. For example, a user can interact with the CA meta-resources 122-1 and 122-2 (e.g., via APIs calls, etc.) to obtain information regarding the status of root CA 124-1 and subordinate CA 124-2, the parents to root CA 124-1 and subordinate CA 124-2, renewal and/or rotation information associated with root CA 124-1 and subordinate CA 124-2, as well as any issued certificates, and/or update and/or make changes to the renewal and/or rotation information associated with root CA 124-1 and subordinate CA 124-2, as well as any issued certificates, and the like.

Further, CA meta-resources 122-1 and 122-2 maintain and monitor the renewal, rotation, and grace period information associated with root CA 124-1 and subordinate CA 124-2 to facilitate automated renewal and rotation of root CA 124-1 and subordinate CA 124-2 and certificates 126-1, 126-2, and 126-3. Further, in facilitating automatic rotation/renewal of one or more of root CA 124-1 and subordinate CA 124-2 and/or any associated issued certificates, CA meta-resources 122-1 and 122-2 can keep track of the rotations and/or renewals to ensure that the active and/or issuing CA and/or certificate is identified so that trust is maintained during and after the rotation/renewal. Further, CA meta-resources 122-1 and 122-2 can roll back to the previous CA and/or certificate during or after a rotation/renewal, if necessary. Additionally, with the renewal and rotation of any of CAs 124-1 and 124-2 or certificates 126-1, 126-2, and 126-3, CA meta-resources 122-1 and 122-2 can communicate with trust store management service 130 to provide a trust store with the new certificate and/or newly created CA, which can then be distributed to the applicable clients to ensure trust of the new certificates and/or CAs.

Further, in implementations where root CA 124-1 and/or subordinate CA 124-2 may be renewed and/or rotated, users may continue to interact with CA meta-resources 122-1 and 122-2. For example, in an example implementation where root CA 124-1 is rotated to root CA2 (not pictured), CA meta-resource 122-1 may be updated to indicate that it is pointing to new root CA2 as the ACTIVE root CA and may maintain information associated with new root CA2. Further, CA meta-resource 122-1 may maintain information associated with root CA 124-1 and indicate a status of DEACTIVATED in the event that PKI hierarchy 120 may need to roll back to root CA 124-1. Accordingly, the user may be provided with a consistent interface through CA meta-resource 122-1 to access and interface with the root CA (whether it is root CA 124-1, or another root CA in its place) of PKI hierarchy 120, without having to manually update, configure, etc. the root CA and regardless of configuration changes, updates, new CAs, etc. to the root CA of PKI hierarchy 120. This is described in further detail in connection with FIGS. 3A-5B.

Figure 2A:
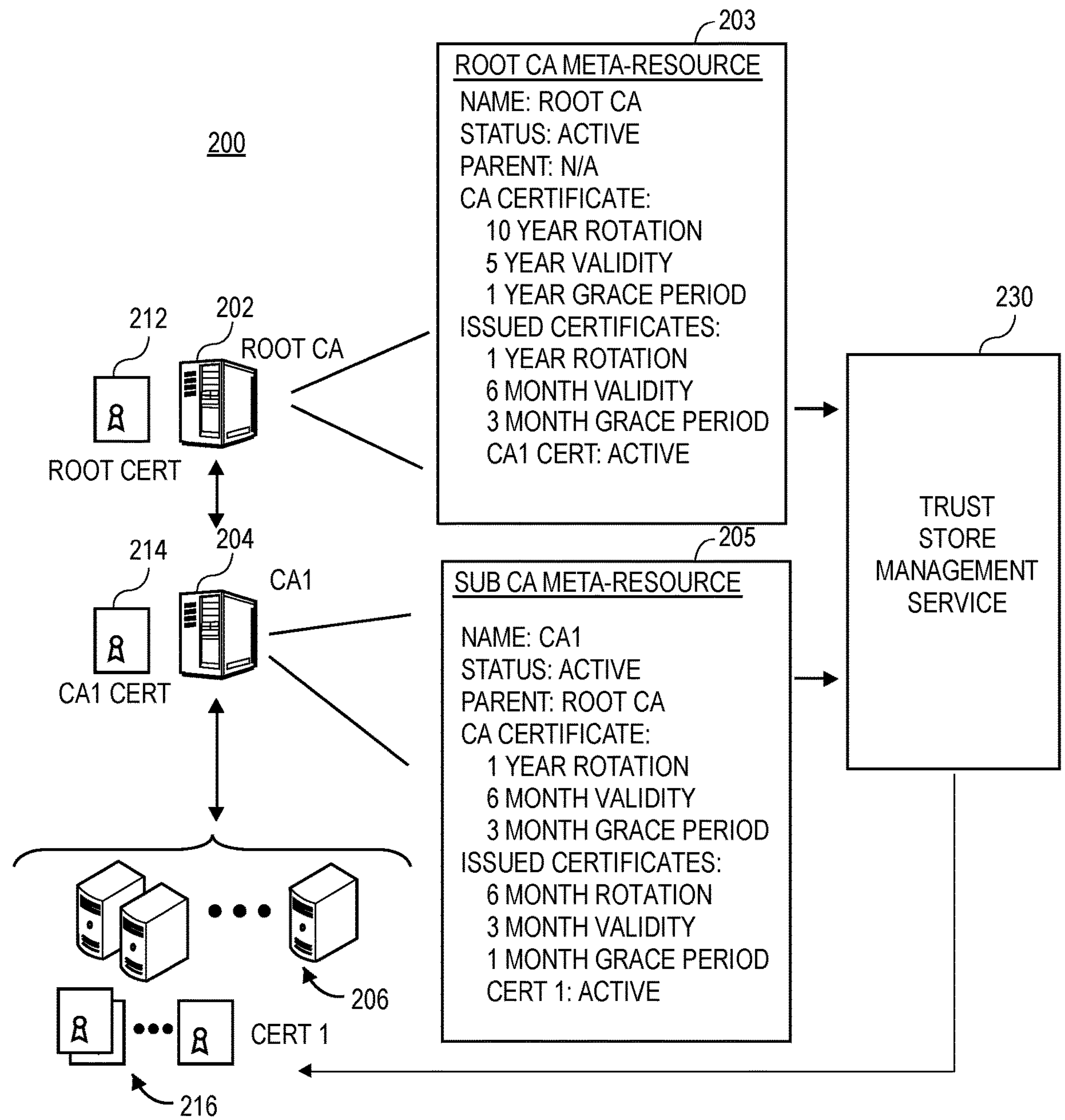
FIGS. 2A-2C are illustrations showing renewal of a certificate in an exemplary PKI hierarchy, according to exemplary embodiments of the present disclosure.
Figure 2B:
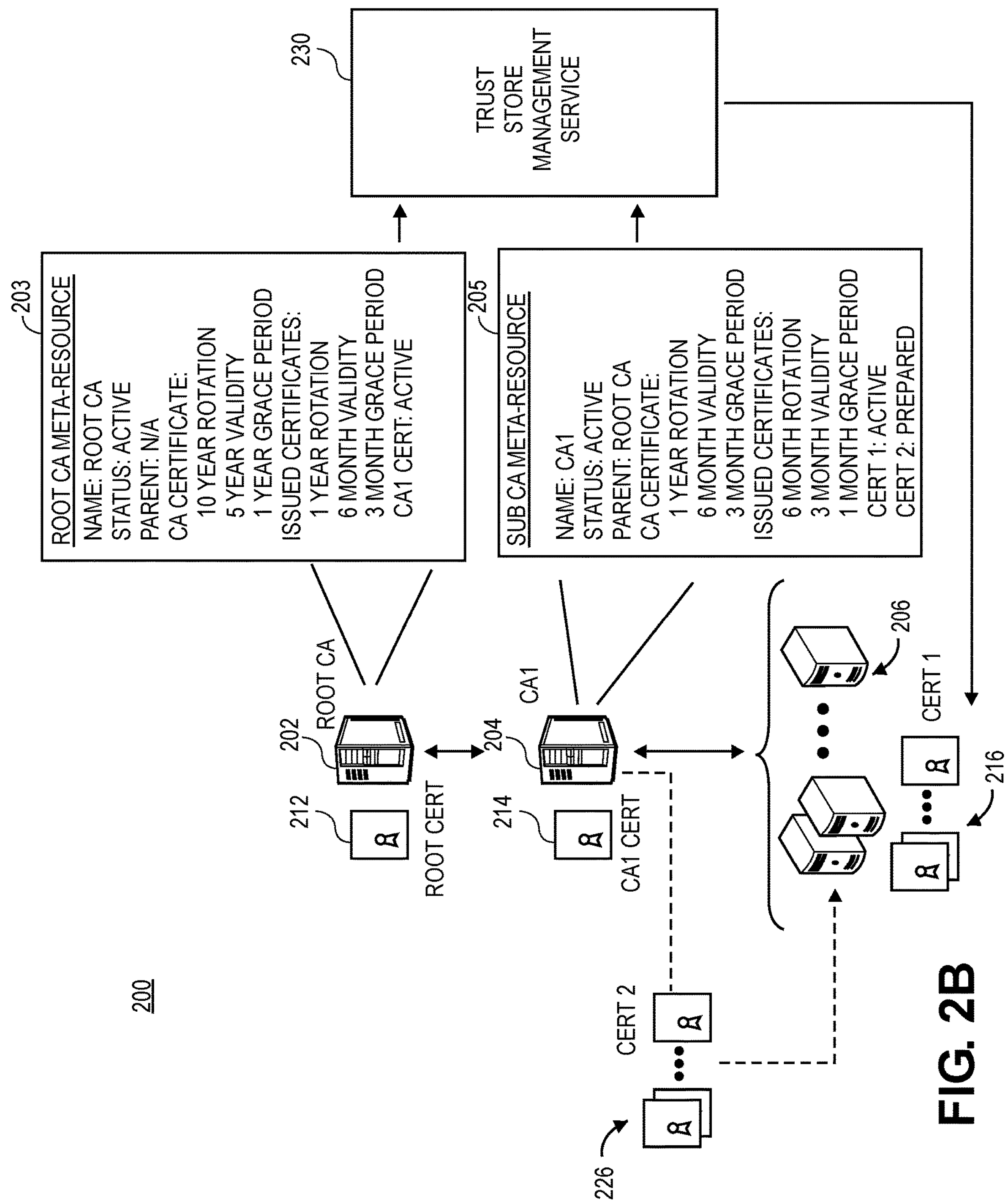
Figure 2C:
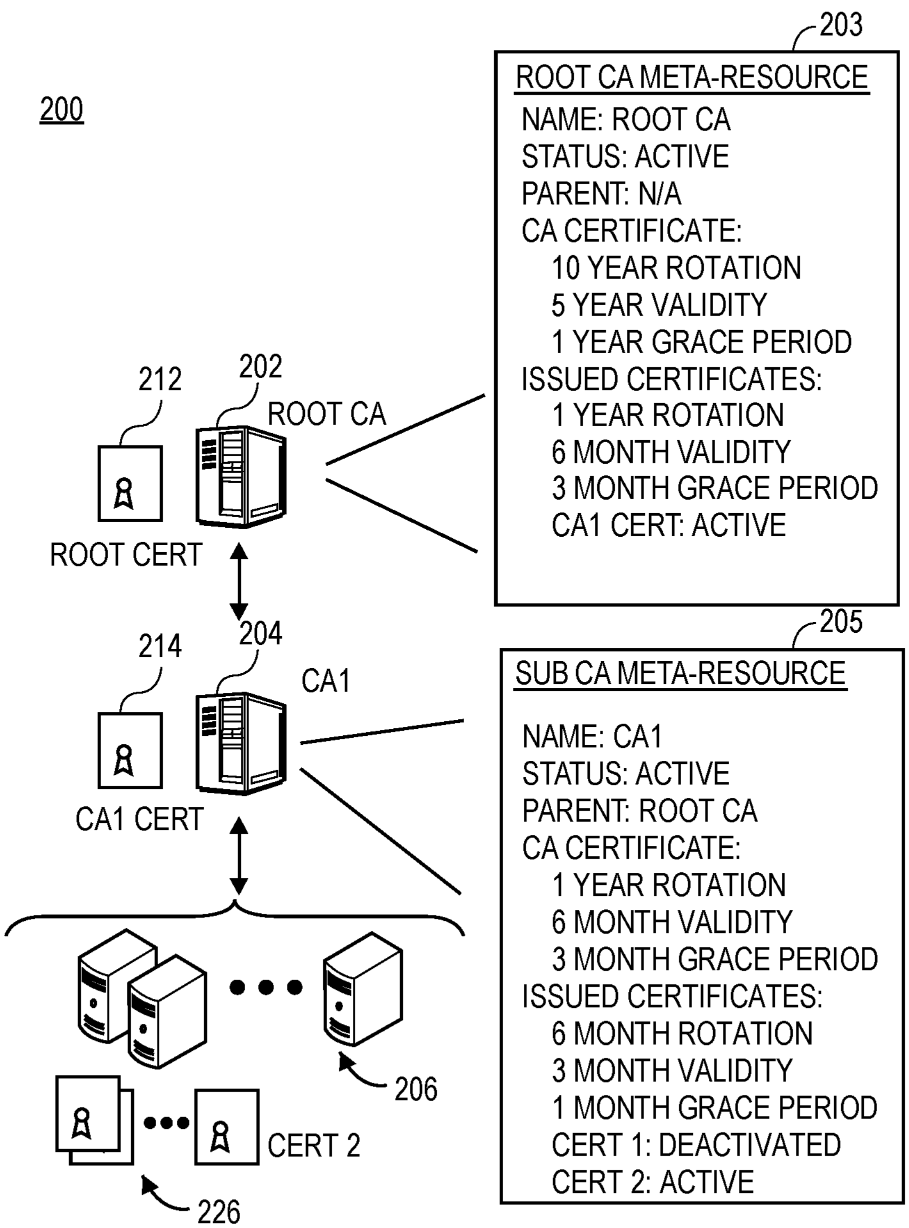

FIGS. 2A-2C illustrate renewal of a certificate in an exemplary PKI hierarchy 200, according to exemplary embodiments of the present disclosure.

As shown in FIG. 2A, PKI hierarchy 200 may include root CA 202 with root certificate 212, subordinate CA 204 with CA certificate 214, and end entities 206 with leaf certificates 216. CA meta-resource 203 may be associated with root CA 202 and CA meta-resource 205 may be associated with subordinate CA 204. CA meta-resource 203 may maintain and monitor information associated with root CA 202, and CA meta-resource 205 may maintain and monitor information associated with subordinate CA 204. For example, CA meta-resource 203 may maintain and monitor information associated with root certificate 212 and certificates issued by root CA 202 (e.g., CA certificate 214). Similarly, CA meta-resource 205 may maintain and monitor information associated with CA certificate 214 and certificates issued by subordinate CA 204 (e.g., leaf certificates 216).

In connection with the example implementation illustrated in FIGS. 2A-2C, renewal of leaf certificates 216 issued by subordinate CA 204 to end entities 206 will be described. However, embodiments of the present disclosure are not limited thereto and may be applicable to the renewal of any certificate in a PKI hierarchy. Further, it will be understood that rotation of leaf certificates 216 may be performed in a substantially similar manner.

As illustrated in FIGS. 2A-2C, CA meta-resource 205 may indicate that certificates issued by CA 204 to end entities 206 (e.g., leaf certificates 216) may be subject to a six month rotation period, a three month validity, and one month grace period. Further CA meta-resource 205 may indicate whether CA 204 CA is actively issuing certificates (e.g., CERT1: ACTIVE). Accordingly, CA meta-resource 205 may monitor the date on which leaf certificates 216 were issued and determine, based on the renewal period and the grace period associated with the certificates, when leaf certificates 216 should be renewed. In an exemplary implementation where leaf certificates 216 were issued on Mar. 25, 2021, it may be determined that leaf certificates 216 will expire on Jun. 25, 2021. Accordingly, in view of the one month grace period, the process to renew leaf certificates 216 may begin one month before the expiration of leaf certificates 216, i.e., May 25, 2021. Alternatively and/or in addition, if it is determined that the entire one month grace period may not be required to successfully renew leaf certificates 216, the process to renew leaf certificates 216 may be started later.

According to aspects of the present disclosure, renewal of leaf certificates 216 may be started such that the grace period may expire prior to expiration of leaf certificates 216. For example, if leaf certificates 216 are set to expire on Jun. 25, 2021 and the grace period is one month, the process to renew leaf certificates 216 may be started on Apr. 25, 2021 such that PKI hierarchy 200 may be rolled back to leaf certificates 216 after expiration of the grace period, if necessary.

Continuing the example implementation, based on the determination that leaf certificates 216 are to expire on Jun. 25, 2021, CA meta-resource 205 may determine that renewal of leaf certificates 216 may begin on Apr. 25, 2021. Accordingly, CA meta-resource 205 may initiate a certificate signing request (CSR) on Apr. 25, 2021 on behalf of end entities 206 using an existing key pair to subordinate CA 204.

In implementations where the leaf certificates 216 are to be rotated, a new key pair may be generated and used in the CSR. For example, a new key pair may be generated for each end entity 206 with a leaf certificate 216 being rotated, and a CSR may be submitted to subordinate CA 204 for each end entity 206 with a leaf certificate 216 to be rotated. The newly generated key pair may be of any length (e.g., 256 bits, 512 bits, 1024 bits, 2048 bits, 4096 bits, etc.) and may be generated using any public key pair generation algorithm (e.g., RSA, DSA, EDSA, etc.). Each CSR may include identifying information corresponding to each respective end entity 206 and the public key of the key pair generated for each respective end entity 206.

After receiving CSRs for each end entity 206 with an expiring leaf certificate 216, subordinate CA 204 may verify the information included in each CSR and, as shown in FIG. 2B, issue renewed certificates 226 for end entities 206. Accordingly, in view of the issued renewed certificates 226, CA meta-resource 205 may include an indication that certificates 226 (i.e., CERT 2) have a status of PREPARED. Other CA meta-resources associated with other CAs in PKI hierarchy 200 that reference leaf certificate 216 may also be updated similarly to include a reference to certificates 226 (i.e., CERT 2) and indicate that certificates 226 (i.e., CERT 2) has a status of PREPARED. Additionally, CA meta-resource 205 may communicate with trust store management service 230 to notify trust store management service 230 of the issuance of renewed certificates 226 so that certificates 226 may be distributed and trusted.

After issuance of certificates 226, CA meta-resource 205 may activate certificates 226 (i.e., CERT 2). According to certain aspects, CA meta-resource 205 may automatically deactivate leaf certificates 216 (i.e., CERT 1) upon activation of certificates 226. Alternatively and/or in addition, certificates 216 may remain active upon activation of certificates 226 such that both leaf certificates 216 and certificates 226 are active. According to embodiments of the present disclosure, CA meta-resource 205 may automatically activate certificates 226 (and/or deactivate leaf certificates 216) at the end of the specified grace period. Continuing the example where a one month grace period was specified and the process was started on Apr. 25, 2021, CA meta-resource may automatically activate certificates 226 (i.e., CERT 2) and deactivate leaf certificates 216 on May 25, 2021. Alternatively and/or in addition, CA meta-resource 205 may activate certificates 226 prior to the end of the grace period.

Optionally, it may be verified that the applicable clients relying on new certificates 226 to connect with end entities 206 are able to successfully establish secure connections with end entities 206 using new certificates 226. If problems and/or issues are identified in verifying renewed certificates 226 to connect with end entities 206, CA meta-resource 205 may roll back to leaf certificates 216 by reactivating and/or maintaining an active status for leaf certificates 216 and deactivating certificates 226 until any such problems and/or issues are resolved. For example, it may be determined that one or more clients are unable to connect to end entities 206 using new certificates 226 (e.g., the one or more clients are unable to verify renewed certificates 226, etc.).

If no problems and/or issues have been identified in connection with renewed certificates 226 and/or if any such problems and/or issues have been resolved, as shown in FIG. 2C, CA meta-resource 205 may maintain certificates 226 as the active certificate and may revoke and/or remove leaf certificates 216 such that clients connecting with end entities 206 will rely on renewed certificates 226, rather than leaf certificates 216. FIG. 2C shows PKI hierarchy 200 with CA meta-resource 205 indicating that certificates 226 are the active certificate (i.e., CERT 2: ACTIVE) and leaf certificates 216 have been deactivated (i.e., CERT 1: DEACTIVATED). Similarly, other CA meta-resources associated with other CAs in PKI hierarchy 200 that reference leaf certificate 216 may also be updated similarly to indicate that certificates 226 (i.e., CERT 2) now has a status of ACTIVE and leaf certificates 216 have been deactivated (i.e., CERT 1: DEACTIVATED). Thus, all applicable CA meta-resources will now point to certificates 226 as the ACTIVE certificate and all calls to any of the CA meta-resources will indicate that certificates 226 are the active certificates and are to be trusted. Accordingly, clients connecting with end entities 206 may no longer rely on leaf certificates 216 and may now rely on renewed certificates 226 in establishing secure connections with end entities 206.

Figure 3A:
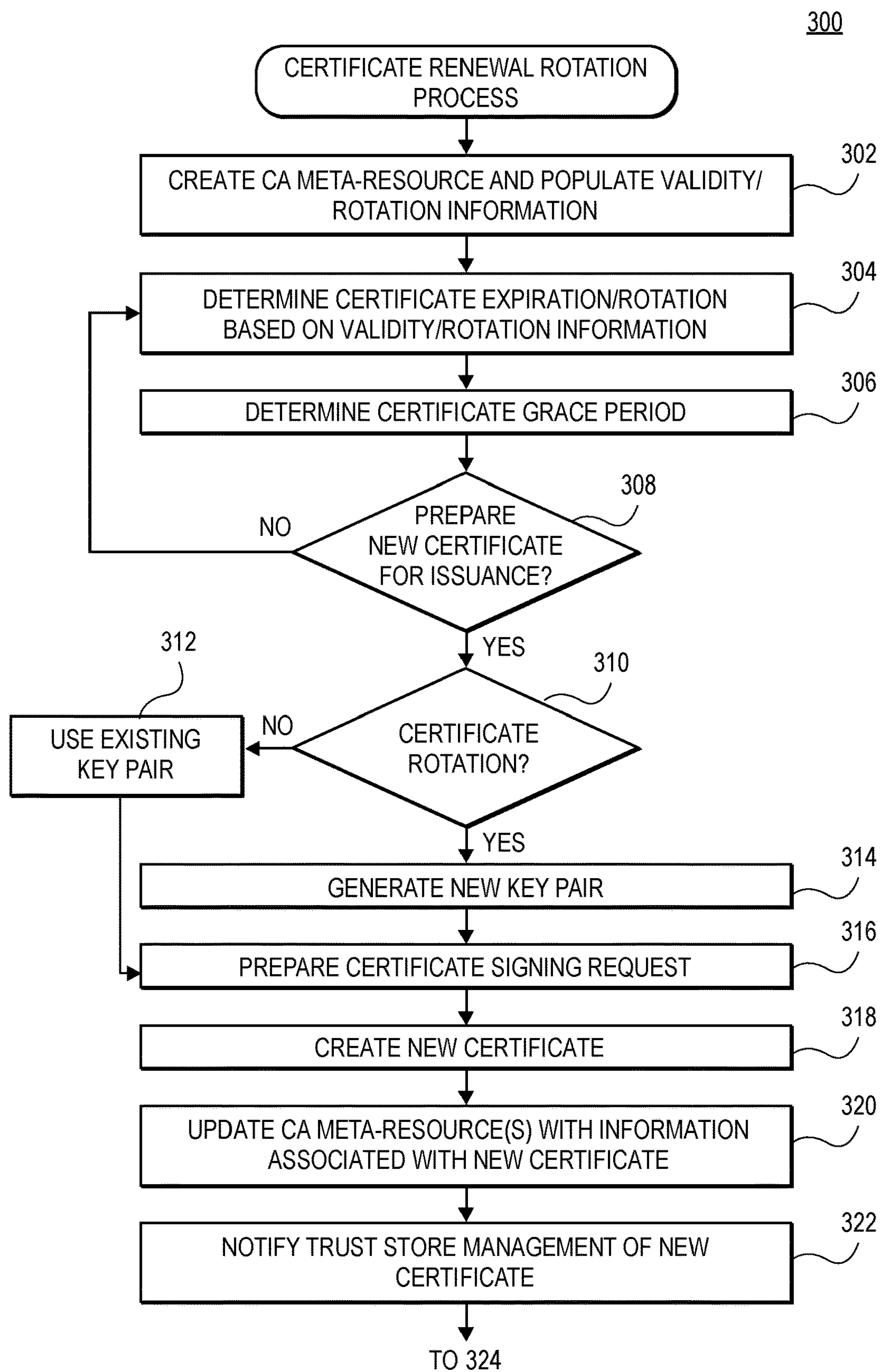
FIGS. 3A and 3B is a flow diagram of a certificate renewal and/or rotation process, according to exemplary embodiments of the present disclosure.
Figure 3B:
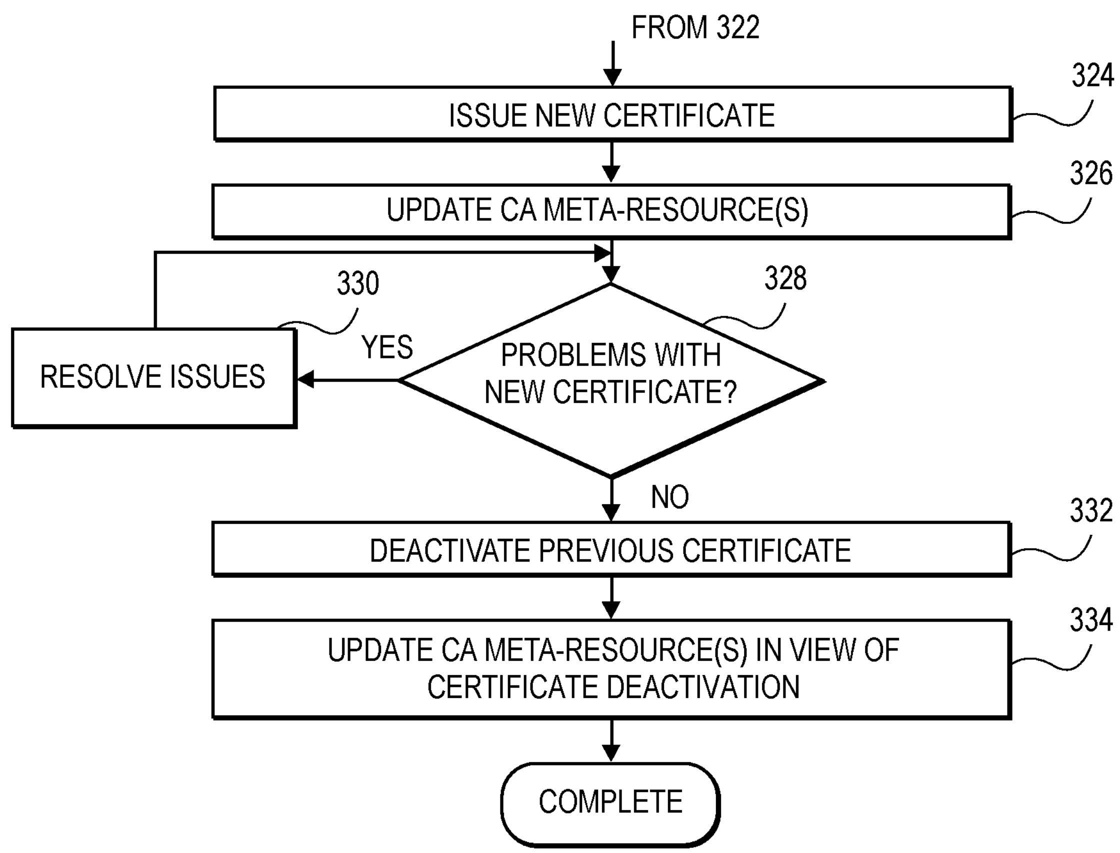

FIGS. 3A and 3B are a flow diagram of an exemplary process 300 for renewing and/or rotating a certificate, according to exemplary embodiments of the present disclosure.

As shown in FIG. 3, process 300 may begin with the creation of a CA meta-resource and populating the CA meta-resource with certificate validity and rotation information, as in step 302. The CA meta-resource may be created at the time a PKI hierarchy and/or a CA is created and/or deployed and may be associated with the CA that issued the certificate to be renewed and/or rotated. Alternatively and/or in addition, the CA meta-resource may be created after the PKI hierarchy and/or CA has been created and/or deployed. Further, the certificate renewal and/or rotation information may be provided by a user or be automatically populated using a knowledge-based system, an expert system, collaborative filtering algorithms, content filtering algorithms, a trained machine learning model, other inference-based systems, etc., or any combination thereof. Further, the validity and/or rotation information may be updated via calls to the CA meta-resource. In addition to validity and/or rotation information, the CA meta-resource may also maintain information, such as, a parent CA identifier, an active CA identifier, an issuing CA identifier, an active issued certificate identifier, a CA status, rotation information, renewal/validity information, grace period information, as well as other information regarding the configuration of a PKI hierarchy.

The CA meta-resource may maintain and monitor the validity and/or rotation information (e.g., renewal frequency, rotation frequency, grace period, etc.) in connection with certificates associated with the CA with which it is associated to facilitate automatic renewal and rotation of the certificates. In step 304, the CA meta-resource may determine the expiration and/or rotation of a certificate based on the validity and rotation information. For example, for a certificate that issued on Feb. 10, 2019 and for which the CA meta-resource indicates a three year renewal term, it may be determined that the certificate will expire on Feb. 10, 2022.

In step 306, the CA meta-resource may also determine a grace period associated with the certificate based on the information maintained in the CA meta-resource. Based on the expiration information and the grace period information, it may be determined in step 308 whether a new certificate should be prepared. For example, if in step 304 it was determined that a certificate will expire or be rotated on Feb. 10, 2022, and, in step 306, it was determined that the grace period specified for the certificate is one year, then, in step 308, it may be determined that the certificate renewal and/or rotation should commence on Feb. 10, 2021. Alternatively and/or in addition, if it is desirable that the certificate being renewed/rotated can still be active upon expiration of the grace period, it may be determined that the renewal and/or rotation should be commenced before Feb. 10, 2021. Accordingly, based on the validity rotation information and the grace period, it may be determined in step 308 that a new certificate should not yet be prepared. If it is determined that a new certificate should not yet be prepared, the process may return to step 304 so that the expiration/rotation and grace period information specified for a certificate may again be determined.

Alternatively, if it is determined that a certificate renewal and/or rotation is to be prepared, it may be determined whether the new certificate is being issued as a renewal or a rotation, as in step 310. If it is determined that the new certificate is for a renewal, the existing key pair is utilized with the new certificate, as shown by step 312.

If it is determined that the new certificate is for a certificate rotation, then a new key pair may be generated, as in step 314. Any length key pair (e.g., 256 bits, 512 bits, 1024 bits, 2048 bits, 4096 bits, etc.) may be generated using any public key pair generation algorithm (e.g., RSA, DSA, EDSA, etc.). Next, a certificate signing request (CSR) may be prepared in step 316. The CSR may include the key pair to be used (e.g., newly generated key pair for certificate rotations and the existing key pair for certificate renewals), as well as information identifying the subject of the new certificate.

In step 318, the CSR may be provided to the issuing CA so that a new certificate may be created. For example, the information included in the CSR may be verified (e.g., the information identifying the subject of the new certificate may be verified using a registration authority, etc.) and the CA may issue a new certificate in response to the CSR.

Once the certificate has been created, the CA meta-resource may be updated to include information associated with the new certificate, as in step 320. For example, the CA meta-resource associated with the issuing CA of the certificate being renewed/rotated may be modified to include a reference and/or pointer to the new certificate that has been created and it may be assigned a status of PREPARED. Additional CA meta-resources (associated with other CAs in the PKI hierarchy) that include a reference to the certificate being renewed/rotated may also be modified to include a reference and/or pointer to the new certificate and may also indicate that the status of the new certificate is PREPARED.

In step 322, the CA meta-resource may communicate with a trust store management service to notify the trust store management service of the issuance of the new certificate. Accordingly, prior to expiration of the certificate being replaced and/or expiration of the grace period associated with the certificate being replaced, in step 324, the new certificate may be issued and/or distributed to the subject of the new certificate by the CA and/or the trust store management service so as to avoid an outage. Further, the trust store management service may also distribute the new certificate to any additional applicable clients so that the applicable clients may trust the new certificate.

Concurrently with the issuance and distribution of the new certificate, the CA meta-resource(s) may be updated to reflect the issuance and distribution of the new certificate, as in step 326. For example, in the CA meta-resource associated with the issuing CA of the certificate, and any other CA meta-resource with a reference to the certificate being replaced, the status of the new certificate may be changed to ACTIVE. Optionally, the status of the certificate being replaced may be changed to DEACTIVATED in the various CA meta-resources. Alternatively, the status of the certificate being replaced may remain ACTIVE until later in process 300. With the activation of the new certificate (e.g., changing the status of the new certificate to ACTIVE in the CA meta-resource(s)), all applicable CA meta-resources will now point to the newly issued certificate as the ACTIVE certificate and all calls to any of the CA meta-resources will indicate that the new certificate is the active certificate and is to be trusted.

In step 328, it may be verified whether any problems have been encountered in the PKI hierarchy based on the new certificate. For example, it may be determined whether the applicable clients relying on the new certificate to connect with the subject of the certificate are able to successfully establish secure connections with the subject of the new certificate using the new certificate.

If problems and/or issues are identified in step 328, the certificate to be replaced may be maintained and/or reactivated until any such problems and/or issues are resolved, as in step 330. For example, it may be determined that one or more clients are unable to connect to an end entity that is the subject of the new certificate using the new certificate. In such a scenario, the certificate being replaced may remain valid until any such problems and/or issues have been resolved. According to certain aspects, the newly created certificate may be deactivated and process 300 of generating another new certificate may be repeated such that an entirely new certificate is issued.

In step 332, once it has been determined that the new certificate is not causing further problems or issues in the PKI hierarchy, the previous certificate that is being replaced may be deactivated. For example, the certificate may be revoked and/or permitted to expire such that clients will no longer rely on the certificate and will instead rely on the new certificate. Concurrently with the issuance and distribution of the new certificate, the CA meta-resource(s) may be updated to reflect the issuance and distribution of the new certificate, as in step 334. Additionally, the CA meta-resource associated with the issuing CA of the certificate, and any other CA meta-resource with a reference to the certificate being replaced, may change the status of the previous certificate being replaced to DEACTIVATED and/or REMOVED and the status of the new certificate may remain ACTIVE. With the deactivation and/or removal of the previous certificate, all applicable CA meta-resources will no longer now point to previous certificate.

FIGS. 4A-4E illustrate rotation and/or renewal of a CA in an exemplary PKI hierarchy 400, according to exemplary embodiments of the present disclosure.

Figure 4A:
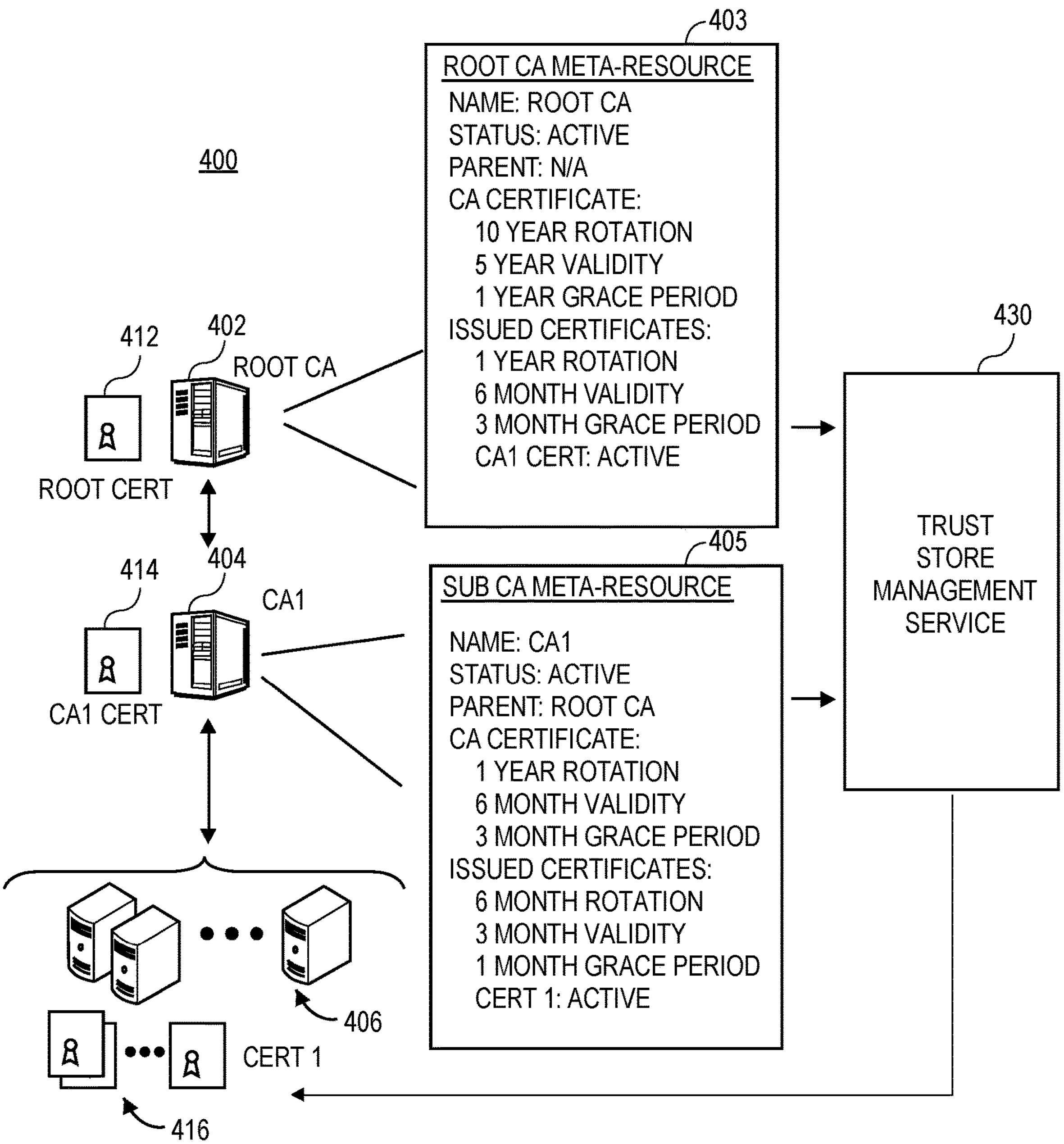
FIGS. 4A-4E are illustrations showing rotation and/or renewal of a certificate authority in an exemplary PKI hierarchy, according to exemplary embodiments of the present disclosure.

As shown in FIG. 4A, PKI hierarchy 400 may include root CA 402 with root certificate 412 (i.e., ROOT CERT), subordinate CA 404 (i.e., CA1) with CA certificate 414 (i.e., CA1 CERT), and end entities 406 with certificates 416 (i.e., CERT 1). Further, CA meta-resource 403 (i.e., ROOT CA META-RESOURCE) may be associated with root CA 402 and CA meta-resource 405 (i.e., SUB CA META-RESOURCE) may be associated with subordinate CA 404. CA meta-resource 403 may maintain and monitor information relevant to root CA 402 and CA meta-resource 405 may maintain and monitor information relevant to CA 404. For example, CA meta-resource 403 may maintain and monitor information associated with root certificate 412 and certificates issued by root CA 402 (e.g., CA certificate 414). Similarly, CA meta-resource 405 may maintain and monitor information associated with CA certificate 414 and certificates issued by subordinate CA 404 (e.g., certificates 416).

In the implementation shown in FIG. 4A, root CA 402 may have issued and signed root certificate 412 to itself. Further, root certificate 412 may be included in a trust store associated with PKI hierarchy 400 and/or embedded in the software of any clients connecting with end entities 406 so that certificates 416 and CA certificate 414 may be validated when establishing a secure connection. Further, root CA 402 may have signed and issued CA certificate 414 to subordinate CA 404, and subordinate CA 404 may have signed and issued certificates 416 to end entities 406.

As illustrated in FIG. 4A, CA meta-resources 403 and 405 may maintain and monitor certain information (e.g., parent CA identifier, active CA identifier, issuing CA identifier, active issued certificate identifier, CA status, rotation information, renewal information, grace period information, and the like) associated with the certificates and CAs with which they are associated. For example, CA meta-resource 403, which may be associated with root CA 402, may maintain and monitor information indicating that root certificate 412 may have a ten year rotation term, a five year validity term, and a one year grace period, and that certificates issued by root CA 402 (e.g., CA certificate 414 for subordinate CA 404) may have a one year rotation term, a six month validity, and a three month grace period. Additionally, CA meta-resource 403 may have a status of root CA 402 (i.e., ACTIVE), a parent CA to root CA 402 (i.e., N/A), a reference to subordinate CA 404, with an indication of the status of CA certificate 414 issued to CA1 (i.e., CA1 CERT: ACTIVE). CA meta-resource 403 may include, maintain, and monitor additional information that may be relevant to root CA 402.

Similarly, CA meta-resource 405, which may be associated with subordinate CA 404, may maintain and monitor that CA certificate 414 may have a one year rotation term, a six month validity, and a three month grace period, and that certificates issued by subordinate CA 404 (e.g., certificates 416) may have a six month rotation term, a three month validity, and a one month grace period. Additionally, CA meta-resource 405 may have a status of subordinate CA 404 (i.e., ACTIVE), a parent CA to subordinate CA 404 (i.e., ROOT CA), a reference to certificate 416, with an indication of the status of the certificate 416 (i.e., CERT 1: ACTIVE). CA meta-resource 405 may include, maintain, and monitor additional information that may be relevant to subordinate CA 404.

In connection with the implementation illustrated in FIGS. 4A-4E, rotation of subordinate CA 404 will be described. However, it will be appreciated that the embodiments of the present disclosure may be applicable to the rotation of any CA in any PKI hierarchy (e.g., a root CA, another subordinate CA, etc.) and that a renewal of CA 404 may be performed in a substantially similar manner.

As illustrated in FIGS. 4A-4E, CA meta-resource 403 and/or 405 may indicate that CA certificate 414 (issued by root CA 402) may be subject to a one year rotation period, a six month validity, and a three month grace period. Accordingly, CA meta-resource 403 and/or 405 may monitor the date on which CA certificate 414 was issued and determine, based on the validity and/or rotation period and the grace period associated with CA certificate 414 when subordinate CA 404 should be renewed and/or rotated. In an exemplary implementation where CA certificate 414 was issued on Jun. 20, 2020, it may be determined that CA certificate 414 will need to be rotated on Jun. 20, 2021, and, in view of the three month grace period, the process to rotate subordinate CA 404 may begin three months before expiration of CA certificate 414, i.e., Mar. 20, 2021. Alternatively and/or in addition, if it is determined that the entire three month grace period may not be required to successfully rotate subordinate CA 404, the process to rotate subordinate CA 404 may be started later. According to another aspect of the present disclosure, renewal and/or rotation of the CA certificate 414 may be started such that the grace period would expire prior to expiration and/or the deadline to rotate CA certificate 414, such that PKI hierarchy 400 may be rolled back to subordinate CA 404 after expiration of the grace period, if necessary.

Figure 4B:
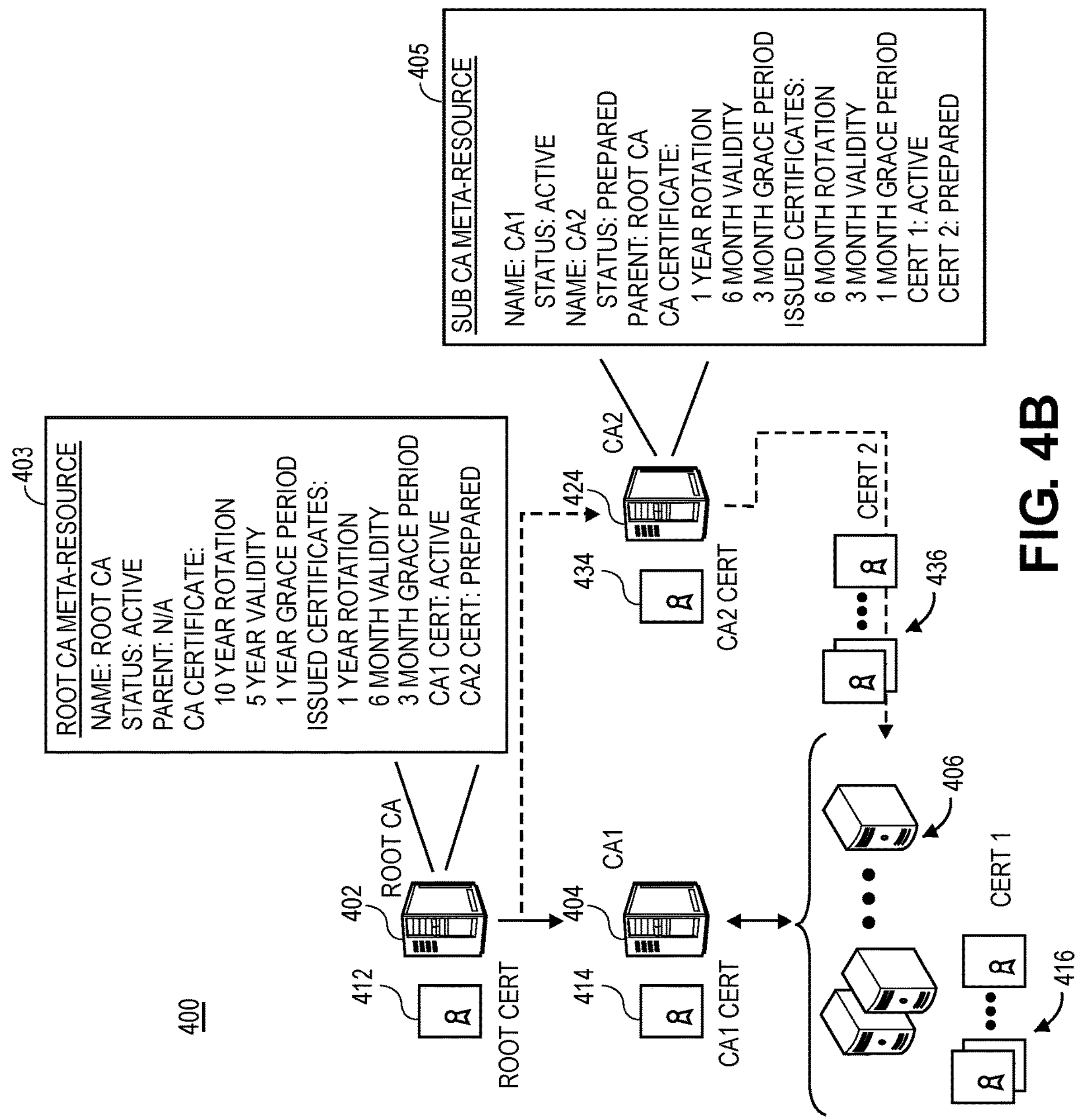

Continuing the example implementation, based on the determination that CA certificate 414 is to be rotated on Jun. 20, 2021, CA meta-resources 403 and/or 405 may determine that rotation of subordinate CA 404 may begin on Mar. 20, 2021. Accordingly, as shown in FIG. 4B, CA meta-resources 403 and/or 405 may create subordinate CA 424. Along with the creation of subordinate CA 424 (i.e., CA2), CA meta-resources 403 and 405 may be updated in view of the creation of subordinate CA 424. For example, CA meta-resource 405 may create a reference or pointer to subordinate CA 424 (i.e., CA2) and the status of subordinate CA 424 may be PREPARED. Similarly, CA meta-resource 403 may create a reference to CA certificate 434 (i.e., CA2 CERT) to be issued to subordinate CA 424 and provide a status of PREPARED in connection with CA certificate 434 as well. Additionally, CA meta-resources 403 and 405 may maintain a status of ACTIVE for CA certificate 414 (i.e., CA1 CERT) and subordinate CA 404 (i.e., CA1), respectively.

After subordinate CA 424 has been created, a key pair of any length (e.g., 256 bits, 512 bits, 1024 bits, 2048 bits, 4096 bits, etc.) may be generated using any public key pair generation algorithm (e.g., RSA, DSA, EDSA, etc.) for newly created subordinate CA 424. Next, a certificate signing request (CSR) may be prepared on behalf of newly created subordinate CA 424. For example, the CSR may include identifying information corresponding to newly created subordinate CA 424 and the public key of the generated key pair. In implementations where subordinate CA 424 is being renewed, generation of a new key pair may be skipped and the existing key pair may be utilized to renew CA certificate 434.

The CSR may be sent to root CA 402, which may verify the information included in the CSR and, as shown in FIG. 4B, issue CA certificate 434 for newly created subordinate CA 424. Accordingly, as shown in FIG. 4B, CA meta-resources 403 and/or 405 may indicate that subordinate CA 424 (i.e., CA2) and CA certificate 434 (i.e., CA2 CERT) have the status of PREPARED. Further, other CA meta-resources associated with other CAs in PKI hierarchy 400 that reference subordinate CA 404 may also be updated similarly to include a reference to subordinate CA 424 (i.e., CA2) and CA certificate 434 (i.e., CA2 CERT), along with an indication that subordinate CA 424 (i.e., CA2) and CA certificate 434 (i.e., CA2 CERT) have a status of PREPARED.

Additionally, CA meta-resource 403 and/or 405 may communicate with trust store management service 430 to notify trust store management service 430 of the creation of new subordinate CA 424 and issuance of newly issued CA certificate 434. This may be performed prior to expiration of CA certificate 414 so as to avoid an outage of any services caused by the unexpected expiration of subordinate CA 404.

After issuance of CA certificate 434 to subordinate CA 424, CA meta-resources 403 and/or 405 may activate CA certificate 434 and/or subordinate CA 424. Accordingly, CA meta-resource 405 change the status of subordinate CA 424 to ACTIVE, and CA meta-resource 403 may change the status of CA certificate 434 to ACTIVE as well. Other CA meta-resources associated with other CAs in PKI hierarchy 400 that reference subordinate CA 404 may also be updated similarly to change the status of subordinate CA 424 (i.e., CA2) and CA certificate 434 (i.e., CA2 CERT) to ACTIVE. Accordingly, calls made to CA meta-resource 403 and/or 405 for issuances of certificates may be assigned to subordinate CA 424 such that newly created subordinate CA 424 may process CSRs from one or more of end entities 406 to issue and sign certificates 436 to one or more of end entities 406.

According to certain aspects, CA meta-resources 403 and/or 405 may automatically activate newly created subordinate CA 424 and CA certificate 434 upon expiration of the grace period. Alternatively and/or in addition, CA meta-resources 403 and/or 405 may activate newly created subordinate CA 424 and CA certificate 434 prior to the end of the grace period. Further, CA meta-resources 403 and/or 405 may maintain subordinate CA 404 in an ACTIVE status upon activation of newly created subordinate CA 424 while trust is being transferred from subordinate CA 404 to newly created subordinate CA 424. Accordingly, during this time while both subordinate CA 404 and 424 are active, calls made to CA meta-resource 403 and/or 405 for issuances of certificates may be assigned to either subordinate CA 404 or subordinate CA 424 for the issuance of certificates 416 or certificates 436, respectively. CA meta-resource 403 and/or 405 and/or trust store management service 430 may distribute CA certificate 434 and/or certificates 436 to the applicable clients to ensure trust of newly created subordinate CA 424 and any certificates 436 issued by newly created subordinate CA 424, while also continuing to facilitate trust of subordinate CA 404, CA certificate 414, and certificates 416.

Figure 4C:
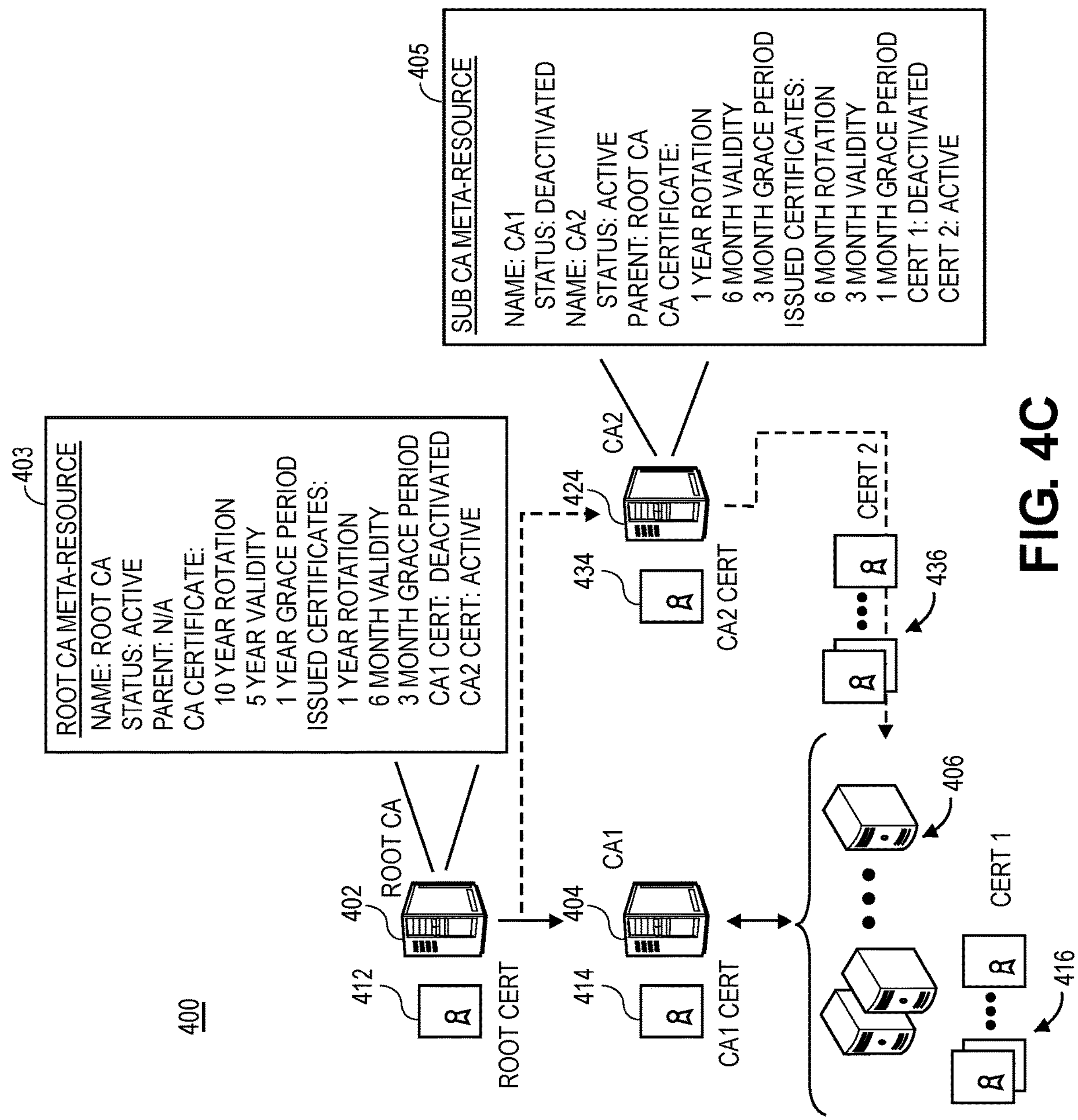

Alternatively and/or in addition, according to certain embodiments and as shown in FIG. 4C, CA meta-resource 403 and/or 405 may change the status of subordinate CA 404 and CA certificate 414 to DEACTIVATED upon activation of newly created subordinate CA 424 and CA certificate 434. For example, subordinate CA 404 may be deactivated even though CA certificate 414 and/or the grace period associated with a rotation of subordinate CA 404 has not yet expired. Accordingly, upon activation of newly created subordinate CA 424 and deactivation of subordinate CA 404, CA meta-resource 403 and/or 405 and/or trust store management service 430 may distribute CA certificate 434 and/or certificates 436 to the applicable clients to ensure trust of newly created subordinate CA 424 and any certificates 436 issued by newly created subordinate CA 424. Accordingly, during this time, calls made to CA meta-resource 403 and/or 405 for issuances of certificates may be assigned to subordinate CA 424 for the issuance of certificates 436.

Figure 4D:
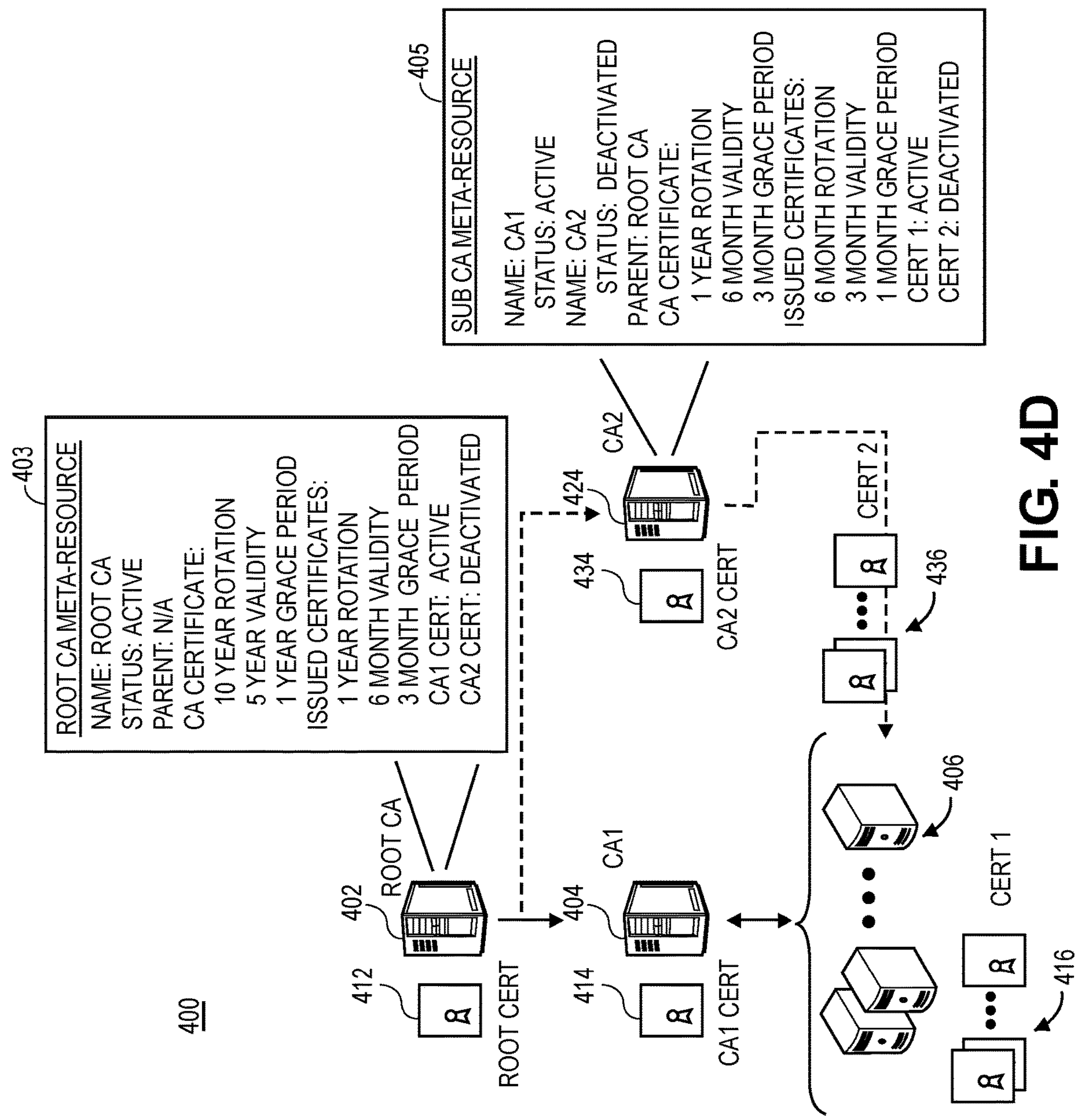

During this period, it may be determined whether the rotation to newly created subordinate CA 424 has created any problems in PKI hierarchy 400. For example, relying parties may be unable to verify certificates 436 issued by newly created subordinate CA 424 and/or CA certificate 434 issued to newly created subordinate CA 424. If problems are encountered with CA certificate 434, newly created subordinate CA 424, and/or certificates 436, CA meta-resource 403 and/or 405 can roll back PKI hierarchy 400 to subordinate CA 404. For example, newly created subordinate CA 424 may be deactivated, and, in implementations where subordinate CA 404 was deactivated, CA meta-resource 403 and/or 405 may reactivate subordinate CA 404. FIG. 4D shows PKI hierarchy 400 where PKI hierarchy 400 has been "rolled back" such that CA meta-resource 403 and/or 405 has reactivated subordinate CA 404 and deactivated newly created subordinate CA 424. As shown in FIG. 4D, CA meta-resource 403 indicates that CA certificate 414 (i.e., CA1 CERT) is ACTIVE and CA certificate 434 (i.e., CA2 CERT) is DEACTIVATED. Similarly, CA meta-resource 405 indicates that subordinate CA 404 (i.e., CA1) and certificates 416 (i.e., CERT 1) are ACTIVE, and subordinate CA 424 (i.e., CA2) and certificates 436 (i.e., CERT 2) are DEACTIVATED. Accordingly, trust has been "rolled back" to subordinate CA 404 and certificates 416 issued by subordinate CA 404.

Figure 4E:
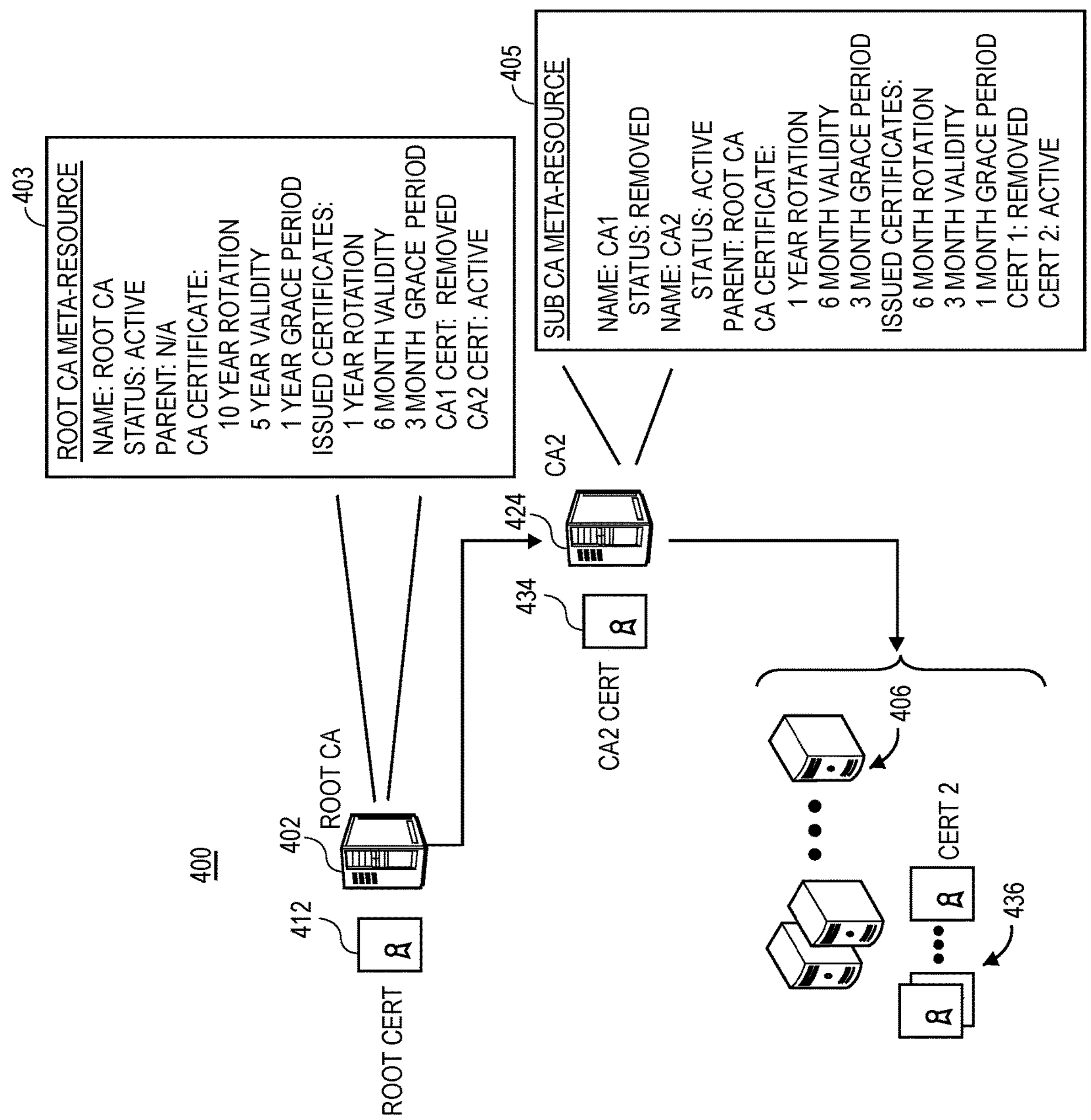

After any problems encountered with the activation of newly created subordinate CA 424 are resolved and/or if no problems are encountered with the activation of newly created subordinate CA 424, subordinate CA 404 and any certificates issued by subordinate CA 404 (e.g., certificates 416) may be deactivated and/or removed. For example, the certificate may be revoked and/or permitted to expire such that clients will no longer rely on the certificate and will instead rely on the new certificate. FIG. 4E shows PKI hierarchy 400 after activation of newly created subordinate CA 424, with CA certificate 434, and deactivation of subordinate CA 404. As shown in FIG. 4E, CA meta-resource 403 indicates that CA certificate 414 (i.e., CA1 CERT) is REMOVED and CA certificate 434 (i.e., CA2 CERT) is ACTIVE. Similarly, CA meta-resource 405 indicates that subordinate CA 404 (i.e., CA1) and certificates 416 (i.e., CERT 1) are REMOVED, and subordinate CA 424 (i.e., CA2) and certificates 436 (i.e., CERT 2) are ACTIVE.

Figure 5A:
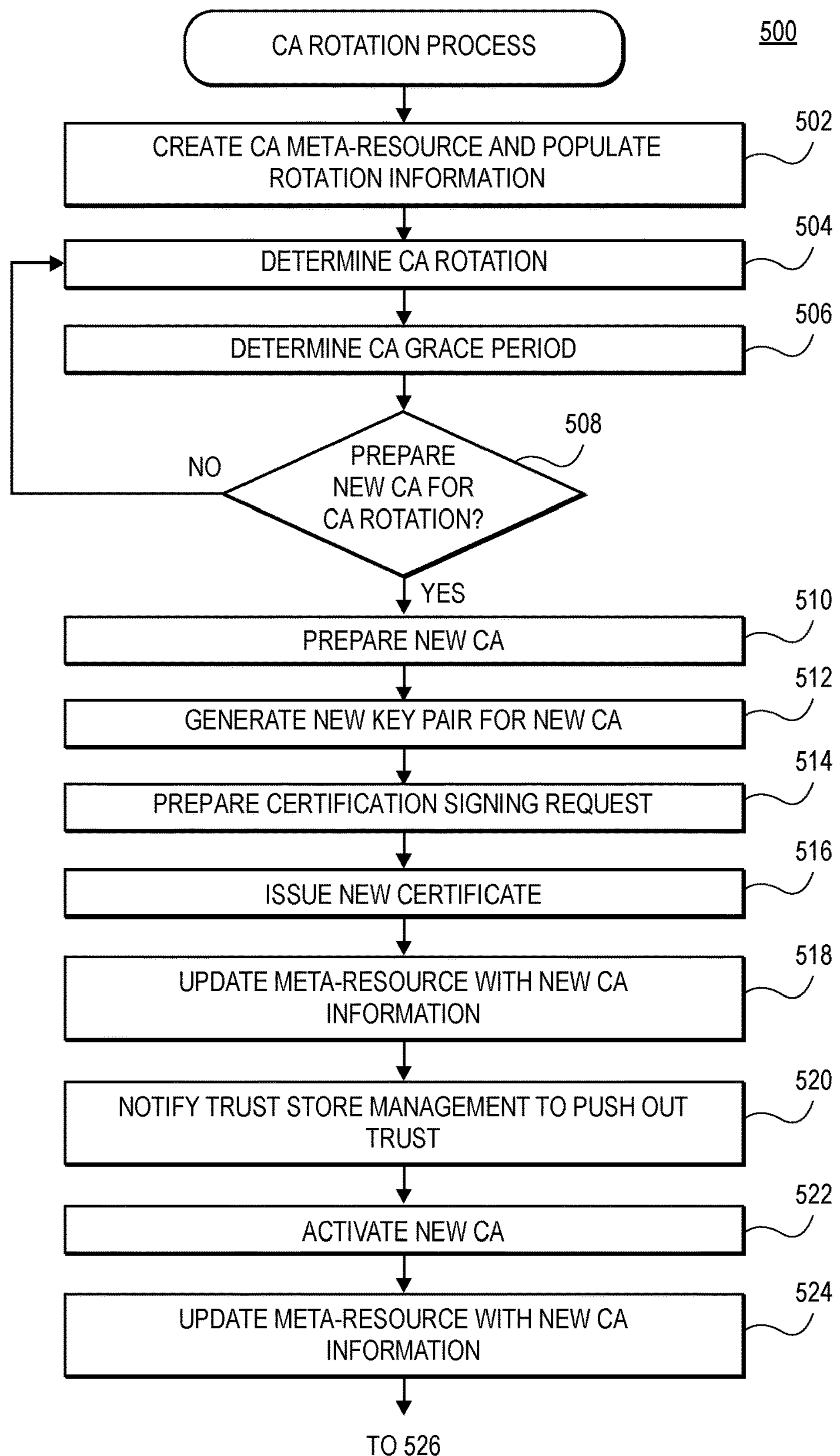
FIGS. 5A and 5B illustrate a flow diagram of an exemplary certificate authority rotation and/or renewal process, according to exemplary embodiments of the present disclosure.
Figure 5B:
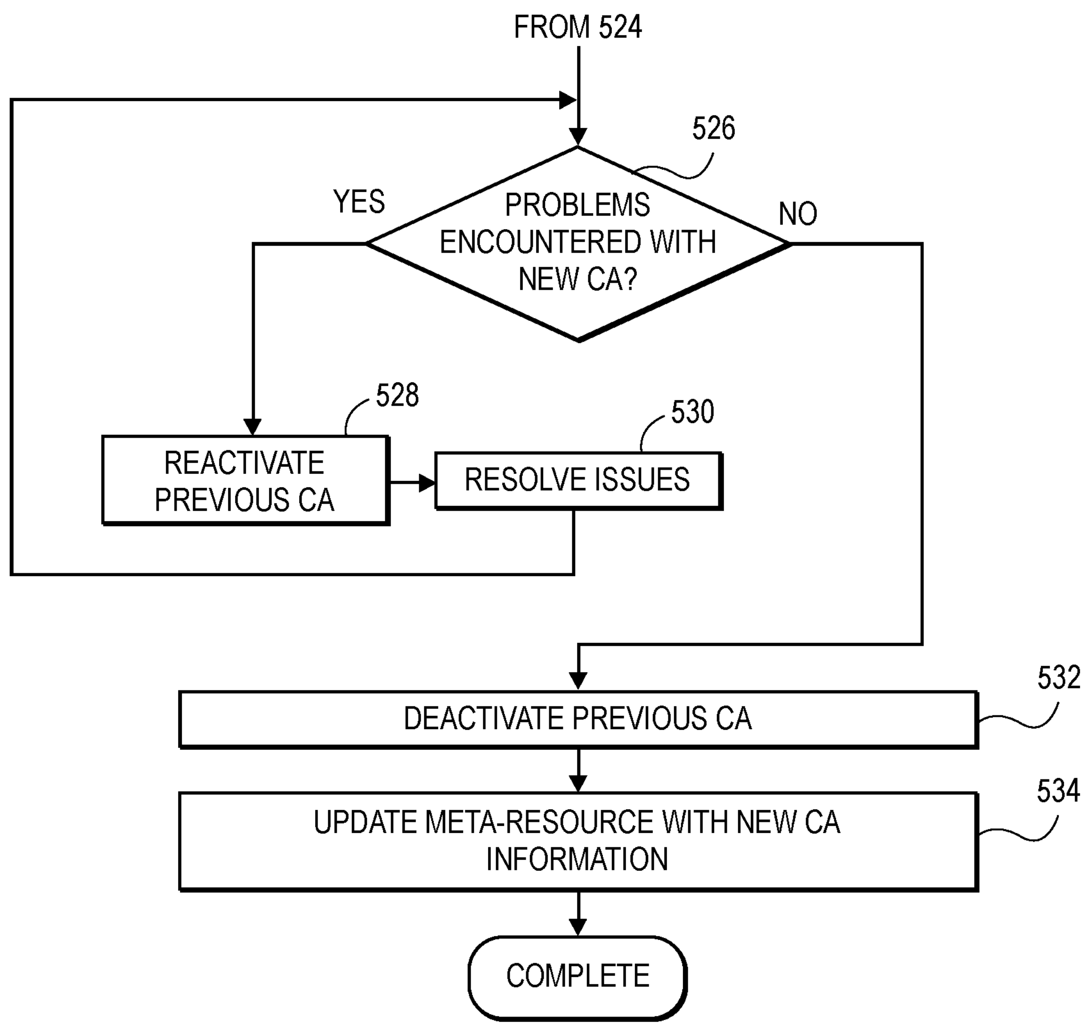

FIGS. 5A and 5B illustrate a flow diagram of an exemplary process 500 for rotating a certificate authority, according to exemplary embodiments of the present disclosure.

As shown in FIGS. 5A and 5B, process 500 may begin with the creation of a CA meta-resource and populating the CA meta-resource with CA rotation information, as in step 502. The CA meta-resource may be created at the time a PKI hierarchy and/or a CA is created and/or deployed. Alternatively and/or in addition, the CA meta-resource may be created after the PKI hierarchy and/or CA has been created and/or deployed. Further, the CA rotation and/or renewal information may be provided by a user or be automatically populated using a knowledge-based system, an expert system, collaborative filtering algorithms, content filtering algorithms, a trained machine learning model, other inference-based systems, etc., or any combination thereof. Further, the validity and/or rotation information may be updated via calls to the CA meta-resource. In addition to validity and/or rotation information, the CA meta-resource may also maintain information, such as, a parent CA identifier, an active CA identifier, an issuing CA identifier, an active issued certificate identifier, a CA status, rotation information, renewal/validity information, grace period information, as well as other information regarding the configuration of a PKI hierarchy. The information stored and maintained by the CA meta-resource may be accessed and/or modified via calls (e.g., through an API, etc.) to the CA meta-resource.

The CA meta-resource may maintain and monitor the CA rotation and/or renewal information (e.g., rotation and/or renewal frequency/term, grace period, etc.) in connection with the PKI hierarchy. In step 504, the CA meta-resource may determine a time period associated with the rotation of a CA. For example, the CA meta-resource may be associated with a CA and may maintain and monitor information associated with the rotation of the CA, such as a rotation term and/or a grace period. Accordingly, in an example where a CA is subject to a one year rotation term and was activated on Dec. 11, 2020, it may be determined that the CA is due to be rotated no later than Dec. 11, 2021.

In step 506, the grace period associated with the rotation term may be determined. For example, the CA meta-resource may indicate a six month grace period in connection with rotation of the CA. Based on the rotation information and the specified grace period, it may be determined in step 508 whether a new CA should be prepared for a CA rotation. For example, if in step 504 it was determined that the CA is due to be rotated and/or renewed on Dec. 11, 2021, and, in step 506, it was determined that the grace period specified for the CA rotation is six months, then, in step 508, it may be determined that the CA rotation may be commenced on Jun. 11, 2021. If it is determined that a CA rotation should not yet be started, the process may return to step 504 so that the rotation and grace period specified for a CA rotation may again be determined.

Alternatively, if it is determined that the CA is to be rotated, a new CA may be created in step 510. In preparation of the new CA, a new key pair of any length (e.g., 256 bits, 512 bits, 1024 bits, 2048 bits, 4096 bits, etc.) may be generated using any public key pair generation algorithm (e.g., RSA, DSA, EDSA, etc.) for the newly created CA, as in step 512. Next, a certificate signing request (CSR) may be prepared on behalf of newly created CA, as in step 514. For example, the CSR may include identifying information corresponding to newly created CA and the public key of the generated key pair. The CSR may be sent to the parent CA, which may verify the information included in the CSR and issue a new CA certificate for the newly created CA, as in step 516.

In view of the new CA, the CA meta-resource may be updated to include information associated with the newly created CA, as in step 518. For example, the CA meta-resource associated with the CA being rotated out may be modified to include a reference and/or pointer to the new CA has been created, and the new CA may be assigned a status of PREPARED. Additional CA meta-resources (associated with other CAs in the PKI hierarchy) that include a reference to the CA being rotated may also be modified to include a reference and/or pointer to the new CA and may also indicate that the status of the new CA is PREPARED.

Additionally, the CA meta-resource may communicate with a trust store management service, as in step 520, to notify the trust store management service of the creation of the new CA and its newly issued CA certificate. The trust store management service may distribute the newly issued CA certificate to any applicable clients to ensure trust of the newly created CA, and any certificates the newly created CA may issue. This may be performed prior to expiration of the CA certificate associated with the CA being replaced so as to avoid an outage.

In step 522, the CA meta-resource may activate the new CA. According to certain embodiments, the CA meta-resource may maintain the CA being replaced in an ACTIVE status. Alternatively, the CA meta-resource may deactivate the CA being replaced. Accordingly, in step 524, the CA meta-resource may be updated in view of the activation of the new CA. For example, the CA meta-resource may change the status of the new CA from PREPARED to ACTIVE and, depending on whether the CA being replaced was deactivated or maintained as ACTIVE, the CA meta-resource may also update the status of the CA being replaced. Accordingly, during this time, calls made to the CA meta-resource for issuances of certificates may be assigned to either the new CA and/or the previous CA depending on the status of the respective CAs. For example, if the previous CA was maintained as ACTIVE, either the new CA or the previous CA may be used to issue certificates. Alternatively, if the previous CA was deactivated, the new CA would be used to issue new certificates during this time.

In step 526, it may be determined whether transitioning to the new CA is presenting any problems with the PKI hierarchy. For example, relying parties may be unable to verify certificates issued by the newly created CA and/or the CA certificate issued to the newly created CA. If problems are encountered with the newly created CA, the PKI hierarchy may be "rolled back" to the CA being replaced. For example, the CA meta-resource may reactivate the previous CA, as in step 528, if it had previously been deactivated and deactivate the new CA.

In step 530, the issues encountered by the transition to the new CA may be resolved. For example, the newly created CA may be deactivated, and the CA and certificates being replaced may be reactivated and re-distributed to the applicable clients to "roll back" trust to the CA being replaced until the problems with the newly created CA are resolved. According to certain aspects, the newly created CA may be deactivated and the process of creating a new CA, generating a key pair and a CSR may to obtain a CA certificate, and the like may be repeated to create an entirely new CA.

After any problems encountered with the activation of newly created CA are resolved and/or if no problems are encountered with the activation of newly created CA, the CA being replaced may be permanently deactivated and removed from the PKI hierarchy, as in step 532. In step 534, the CA meta-resource may be updated with the removal of the previous CA and the ACTIVE status of the new CA.

Figure 6:
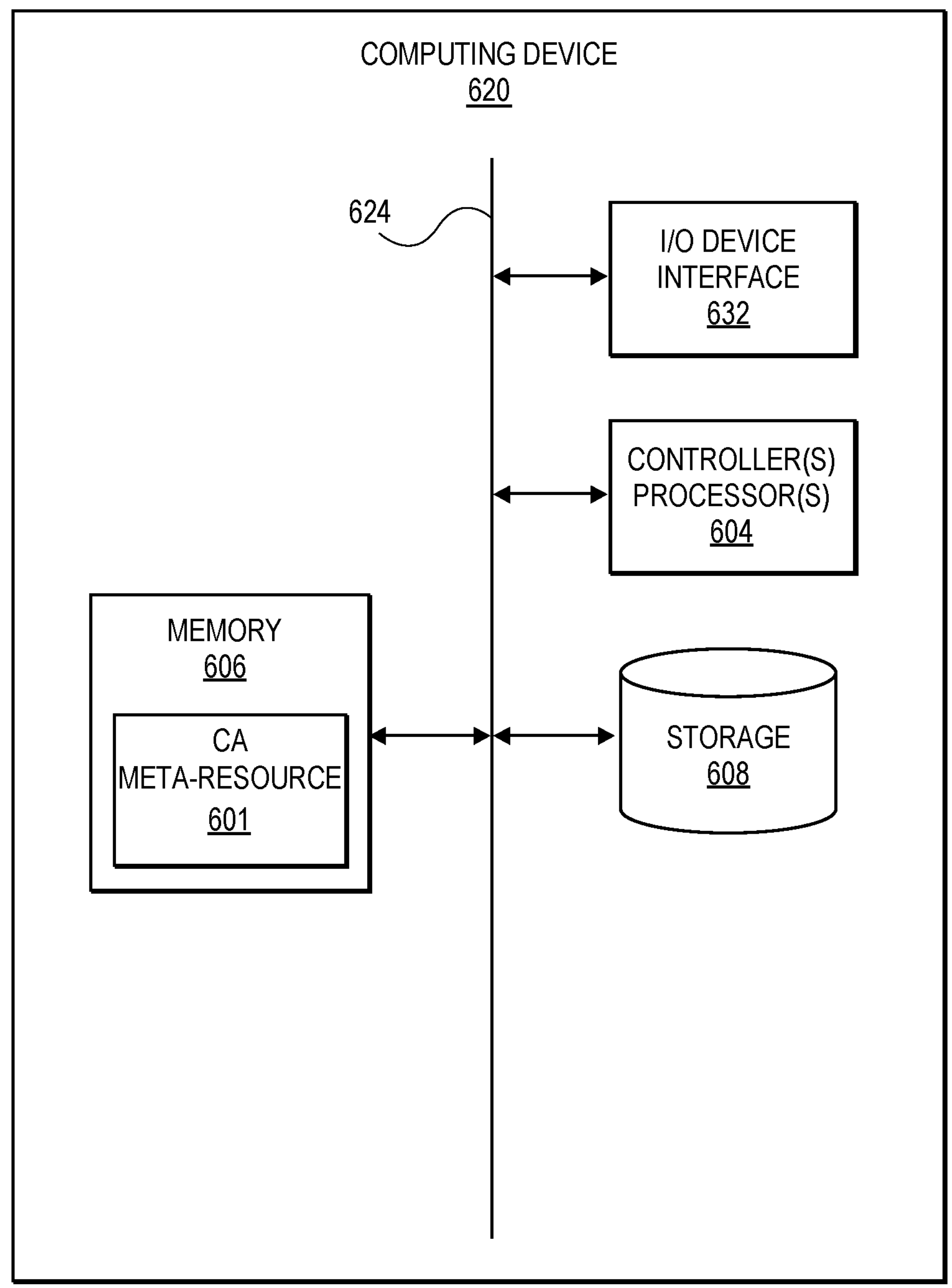
FIG. 6 is a block diagram of an exemplary computing device, according to exemplary embodiments of the present disclosure.

FIG. 6 is a block diagram of an exemplary computing device, according to embodiments of the present disclosure.

FIG. 6 illustrates example components of a computing device or a stand-alone server/CA meta-resource, in accordance with embodiments of the present disclosure. The components illustrated in FIG. 6 may also be representative of any other device in which the CA meta-resource may be included, and multiple such computing devices 620 may be included in the system. In operation, computing device 620 may include computer-readable and computer-executable instructions that reside on computing device 620, as will be discussed further below.

Computing device 620 may include one or more controllers/processors 604, that may include a central processing unit (CPU) for processing data and computer-readable instructions, and a memory 606 for storing data and instructions of the respective device. Memory 606 may individually include volatile random-access memory (RAM), non-volatile read only memory (ROM), non-volatile magnetoresistive (MRAM) and/or other types of memory. Computing device 620 may also include data storage component 608, for storing data and controller/processor-executable instructions. Data storage component 608 may include one or more non-volatile storage types such as magnetic storage, optical storage, solid-state storage, etc. Computing device 620 may also be connected to removable or external non-volatile memory and/or storage (such as a removable memory card, memory key drive, networked storage, etc.) through input/output device interface 632.

Computer instructions for operating computing device 620 and its various components may be executed by controller(s)/processor(s) 604, using the memory 606 as temporary "working" storage at runtime. Computing device's 620 computer instructions may be stored in a non-transitory manner in non-volatile memory 606, storage 608, or one or more external device(s). For example, CA meta-resource 601, which may be implemented in software that is stored in memory 606 and executed by one or more processors 604, may be operable to perform some or all of the implementations discussed herein. Alternatively, some or all of the executable instructions of CA meta-resource 601 and/or executable instructions for other components of computing device 620 may be embedded in hardware or firmware, in addition to or instead of, software.

Computing device 620 may also include input/output device interfaces 632. A variety of components may be connected through the input/output device interfaces. Additionally, computing device 620 may include address/data bus 624 for conveying data among components of computing device 620. Each component within computing device 620 may also be directly connected to other components in addition to (or instead of) being connected to other components across bus 624.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, encryption, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, one or more of the components may be implemented in firmware or hardware.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to automatically rotate a certificate authority (CA) of a public key infrastructure (PKI) hierarchy, comprising:

creating a plurality of CA meta-resources that correspond to a plurality of CAs, wherein:

a first CA meta-resource of the plurality of CA meta-resources corresponds to the CA, includes a first reference to the CA, and is configured to maintain and monitor a plurality of CA information associated with the CA; and the plurality of CA information includes a first status associated with the first reference to the CA;

determining, using the first CA meta-resource and based at least in part on the plurality of CA information, that the CA is to be rotated with a new CA;

automatically creating the new CA, based at least in part on the plurality of CA information, to replace the CA;
activating the new CA;
creating a second reference in the first CA meta-resource to the new CA;
assigning, in the first CA meta-resource, a second status associated with the second reference to the new CA as active, such that calls to the first CA meta-resource for issuance of a certificate are assigned to the new CA;
modifying the first status associated with the first reference to the CA to deactivated;
notifying, by the first CA meta-resource, a trust store associated with the PKI hierarchy of the new CA;
distributing trust of the new CA to the PKI hierarchy;
identifying an issue with the PKI hierarchy in connection with the new CA; and
based at least in part on the identification of the issue:
modifying the second status associated with the second reference to the new CA to deactivated; and
modifying the first status associated with the first reference to the CA to activated, such that calls to the first CA meta-resource for issuance of certificates are assigned to the CA.

2. The computer-implemented method of claim 1, wherein the plurality of CA information includes a grace period and the new CA is activated at an expiration of the grace period.

3. The computer-implemented method of claim 1, wherein creating the new CA includes, at least:
generating a new key pair in connection with the new CA, the new key pair including a public key;
generating a certificate signing request in connection with the new CA, wherein the certificate signing request includes the public key and an identifier of the new CA;
verifying, by a parent CA, the certificate signing request; and
issuing, based at least in part on the verification of the certificate signing request, a new certificate for the new CA, wherein the new certificate includes the public key.

4. The computer-implemented method of claim 1, wherein the method is performed without manual configuration of the PKI hierarchy.

5. A computing system, comprising:
one or more processors; and
a memory storing program instructions that, when executed by the one or more processors, cause the one or more processors to at least:
create a plurality of certificate authority (CA) meta-resources that correspond to a plurality of CAs, wherein:
a first CA meta-resource of the plurality of CA meta-resources corresponds to a first CA of the plurality of CAs;
the first CA meta-resource is configured to maintain a plurality of CA information and an identifier indicating an active issuing CA; and the identifier indicates that the first CA is the active issuing CA;
determine, using the first CA meta-resource and based at least in part on the plurality of CA information, that the first CA is to be replaced with a new CA;
automatically create, using the first CA meta-resource, the new CA based at least in part on the plurality of CA information;
activate, using the first CA meta-resource, the new CA;
modify the identifier of the first CA meta-resource to indicate that the new CA is the active issuing CA, such that calls to the first CA meta-resource for issuance of a certificate are assigned to the new CA;
identify an issue with the new CA; and
based at least in part on identification of the issue:
deactivate, using the first CA meta-resource, the new CA; and
modify the identifier of the first CA meta-resource to indicate that the first CA is the active issuing CA, such that calls to the first CA meta-resource for issuance of certificates are assigned to the first CA.

6. The computing system of claim 5, wherein automatic creation of the new CA includes, at least:
generating a new key pair for the new CA;
generating a certificate signing request using the new key pair;
transmitting the certificate signing request to a parent CA;
verifying, by the parent CA, the certificate signing request; and
generating a new CA certificate for the new CA based at least in part on the verification of the certificate signing request.

7. The computing system of claim 5, wherein the first CA meta-resource maintains a status associated with the new CA and the program instructions, when executed by the one or more processors, further cause the one or more processors to at least:
assign, prior to activation of the new CA, the status associated with the new CA as prepared.

8. The computing system of claim 7, wherein the first CA meta-resource maintains a second status associated with the first CA and wherein the program instructions, when executed by the one or more processors, further cause the one or more processors to at least:
modify the status of the new CA from prepared to active; and
maintain the second status of the first CA as active, such that the identifier of the first CA meta-resource indicates that the new CA and the first CA are the active issuing CAs, so that calls to the first CA meta-resource for issuance of a certificate are assigned to one of the new CA or the first CA.

9. The computing system of claim 8, wherein the program instructions, when executed by the one or more processors, further cause the one or more processors to at least:
modify the second status of the first CA from active to deactivated, such that the identifier of the first CA meta-resource indicates that the new CA is the active issuing CA, so that calls to the first CA meta-resource for issuance of a certificate are assigned to the new CA.

10. The computing system of claim 9, wherein the program instructions, when executed by the one or more processors, further cause the one or more processors to at least:
notify, using the first CA meta-resource, a trust store service to distribute trust of the new CA to a public key infrastructure (PKI) hierarchy.

11. The computing system of claim 5, wherein the plurality of CA information includes user provided rotation and renewal information associated with the first CA.

12. The computing system of claim 5, wherein the plurality of CA information includes rotation and renewal information associated with the first CA, and wherein the program instructions, when executed by the one or more processors, further cause the one or more processors to at least:

determine, based at least in part on a configuration of a public key infrastructure (PKI) hierarchy, recommended rotation and renewal information associated with the first CA.

13. The computing system of claim 5, wherein the first CA meta-resource includes at least one of:

a certificate renewal term;

a certificate renewal grace period;

a certificate rotation term;

a certificate rotation grace period;

a CA identifier, or a parent CA identifier.

14. A computer-implemented method, comprising:

creating a plurality of certificate authority (CA) meta-resources that correspond to a plurality of certificates and are configured to maintain and monitor a certificate status and certificate renewal and rotation information associated with the plurality of certificates, so as to automatically initiate at least one of automatic rotation or renewal of the plurality of certificates;

determining, using a first CA meta-resource of the plurality of CA meta-resources and based at least in part on the certificate renewal and rotation information of the first CA meta-resource, that a first corresponding certificate of the plurality of certificates is to be replaced;

in response to determining that the first corresponding certificate is to be replaced, automatically generating a new certificate to replace the first corresponding certificate;

creating a reference to the new certificate in the first CA meta-resource;

activating, using the first CA meta-resource, the new certificate and assigning a status associated with the reference to the new certificate as active;

modifying the certificate status associated with the first corresponding certificate to deactivated;

distributing trust of the new certificate;

identifying an issue in connection with the new certificate;

based at least in part on the identification of the issue, modifying the status of the new certificate to deactivated; and based at least in part on the identification of the issue, modifying the certificate status associated with the first corresponding certificate to active.

15. The computer-implemented method of claim 14, wherein the new certificate is one of:

a root certificate;

a CA certificate; or a leaf certificate.

16. The computer-implemented method of claim 14, wherein the first CA meta-resource includes at least one of:

a certificate renewal term;

a certificate renewal grace period;

a certificate rotation term;

a certificate rotation grace period;

a CA identifier, or a parent CA identifier.

* * * * *